(12) United States Patent
Bisaiji et al.

(10) Patent No.: US 8,683,784 B2
(45) Date of Patent: Apr. 1, 2014

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/202,733

(22) PCT Filed: Mar. 15, 2010

(86) PCT No.: PCT/JP2010/054740
§ 371 (c)(1),
(2), (4) Date: Sep. 30, 2011

(87) PCT Pub. No.: WO2011/114501
PCT Pub. Date: Sep. 22, 2011

(65) Prior Publication Data
US 2012/0124971 A1    May 24, 2012

(51) Int. Cl.
*F01N 3/028* (2006.01)
(52) U.S. Cl.
USPC .............................................. 60/286; 60/295
(58) Field of Classification Search
USPC ........................... 60/284, 286, 295, 301, 303
See application file for complete search history.

(56) References Cited

U.S. PATENT DOCUMENTS

| | | | |
|---|---|---|---|
| 7,063,642 B1 | 6/2006 | Hu et al. | |
| 7,082,753 B2 | 8/2006 | Dalla Betta et al. | |
| 7,111,456 B2 | 9/2006 | Yoshida et al. | |
| 7,137,379 B2 | 11/2006 | Sasaki et al. | |
| 7,146,800 B2 | 12/2006 | Toshioka et al. | |
| 7,165,393 B2 | 1/2007 | Betta et al. | |
| 7,299,625 B2 | 11/2007 | Uchida et al. | |
| 7,332,135 B2 | 2/2008 | Gandhi et al. | |
| 7,454,900 B2 | 11/2008 | Hayashi | |
| 7,703,275 B2 | 4/2010 | Asanuma et al. | |

(Continued)

FOREIGN PATENT DOCUMENTS

| | | |
|---|---|---|
| EP | 1 033 479 A2 | 9/2000 |
| EP | 1 519 015 A2 | 3/2005 |

(Continued)

OTHER PUBLICATIONS

Jun. 15, 2010 International Search Report issued in PCT/JP2010/054740 (with translation).

(Continued)

*Primary Examiner* — Thomas Denion
*Assistant Examiner* — Jonathan Matthias
(74) *Attorney, Agent, or Firm* — Oliff & Berridge, PLC

(57) ABSTRACT

Inside an engine exhaust passage, in order from the upstream side, a hydrocarbon feed valve, oxidation catalyst, and exhaust purification catalyst are arranged. A first $NO_x$ purification method which lowers the air-fuel ratio of the exhaust gas flowing into the exhaust purification catalyst by a predetermined period while maintaining it lean so as to remove $NO_x$ without causing $NO_x$ to be stored in the form of nitrates and a second $NO_x$ purification method which switches the air-fuel ratio of the exhaust gas flowing into the exhaust purification catalyst from lean to rich by a period longer than the above period so as to remove $NO_x$ are selectively used in accordance with an operating state of the engine.

18 Claims, 17 Drawing Sheets

(56) References Cited

U.S. PATENT DOCUMENTS

| | | |
|---|---|---|
| 7,707,821 B1 | 5/2010 | Legare |
| 8,215,101 B2 | 7/2012 | Tsujimoto et al. |
| 8,281,569 B2 | 10/2012 | Handa et al. |
| 2003/0010020 A1 | 1/2003 | Taga et al. |
| 2003/0101713 A1 | 6/2003 | Dalla Betta et al. |
| 2004/0050037 A1 | 3/2004 | Betta et al. |
| 2004/0154288 A1 | 8/2004 | Okada et al. |
| 2004/0187477 A1 | 9/2004 | Okugawa et al. |
| 2005/0135977 A1 | 6/2005 | Park et al. |
| 2006/0053778 A1 | 3/2006 | Asanuma et al. |
| 2006/0286012 A1 | 12/2006 | Socha et al. |
| 2007/0059223 A1* | 3/2007 | Golunski et al. .............. 422/180 |
| 2008/0148711 A1 | 6/2008 | Takubo |
| 2008/0196398 A1 | 8/2008 | Yan |
| 2008/0276602 A1* | 11/2008 | McCabe et al. ................ 60/295 |
| 2009/0084091 A1 | 4/2009 | Tsujimoto et al. |
| 2009/0282809 A1 | 11/2009 | Toshioka |
| 2010/0242459 A1* | 9/2010 | Tsujimoto et al. .............. 60/320 |

FOREIGN PATENT DOCUMENTS

| | | |
|---|---|---|
| EP | 1 710 407 A1 | 10/2006 |
| EP | 1 793 099 A1 | 6/2007 |
| EP | 2 063 078 A1 | 5/2009 |
| JP | A-2000-257419 | 9/2000 |
| JP | A-2002-188429 | 7/2002 |
| JP | A-2005-177738 | 7/2005 |
| JP | A-2007-064167 | 3/2007 |
| JP | B2-3969450 | 6/2007 |
| JP | A-2008-69769 | 3/2008 |
| JP | A-2008-232003 | 10/2008 |
| JP | A-2008-543559 | 12/2008 |
| JP | A-2009-275666 | 11/2009 |
| WO | WO 2008/012653 A2 | 1/2008 |
| WO | WO 2009/082035 A1 | 7/2009 |

OTHER PUBLICATIONS

Jun. 15, 2010 Written Opinion issued in PCT/JP2010/054740 (with translation).

Jun. 20, 2012 Search Report issued in European Patent Application No. 10845966.0.

Jun. 15, 2010 International Search Report issued in International Application No. PCT/JP2010/054731 (with translation).

Jun. 29, 2010 International Search Report issued in International Patent Application No. PCT/JP2010/056345.

Apr. 4, 2013 Office Action issued in U.S. Appl. No. 13/255,710.

U.S. Appl. No. 13/255,774 in the name of Bisalti et al., filed Sep. 22, 2011.

U.S. Appl. No. 13/255,710 in the name of Bisaiji et al., filed Oct. 12, 2011.

Office Action dated May 15, 2013 issued in U.S. Appl. No. 13/202,694.

U.S. Appl. No. 13/262,858, filed Oct. 4, 2011 in the name of Bisaiji et al.

U.S. Appl. No. 13/264,230, filed Oct. 13, 2011 in the name of Bisaiji.

U.S. Appl. No. 13/202,692, filed Sep. 20, 2011 in the name of Umemoto et al.

Office Action dated Oct. 24, 2013 issued in U.S. Appl. No. 13/255,710.

Office Action dated Dec. 20, 2013 issued in U.S. Appl. No. 13/264,230.

* cited by examiner

Fig.2
(A)
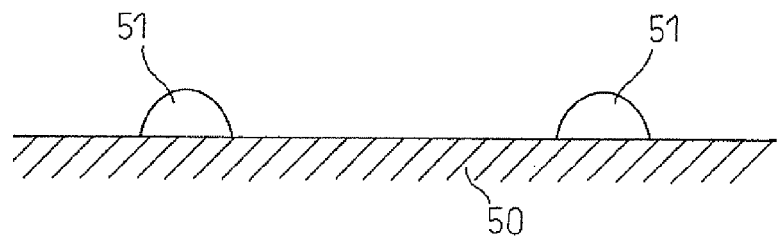
(B)
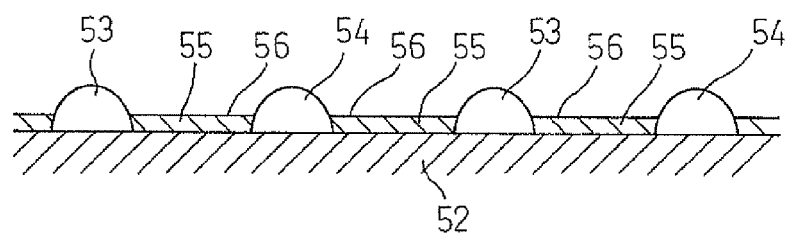
Fig.3
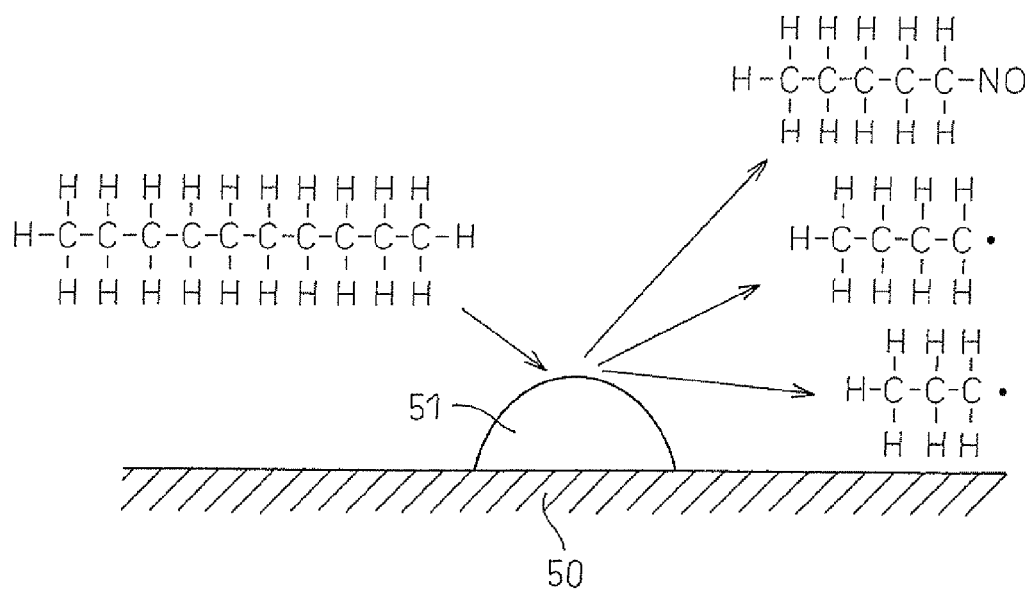

Fig.6
(A)
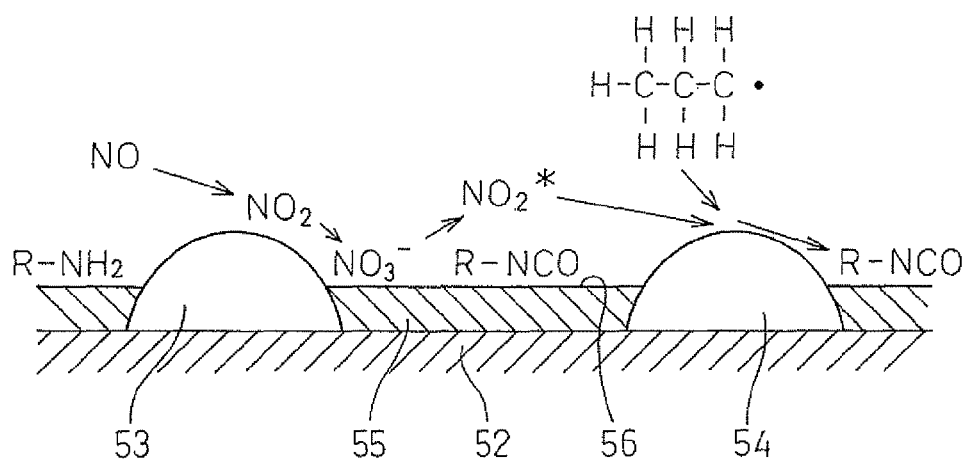
(B)
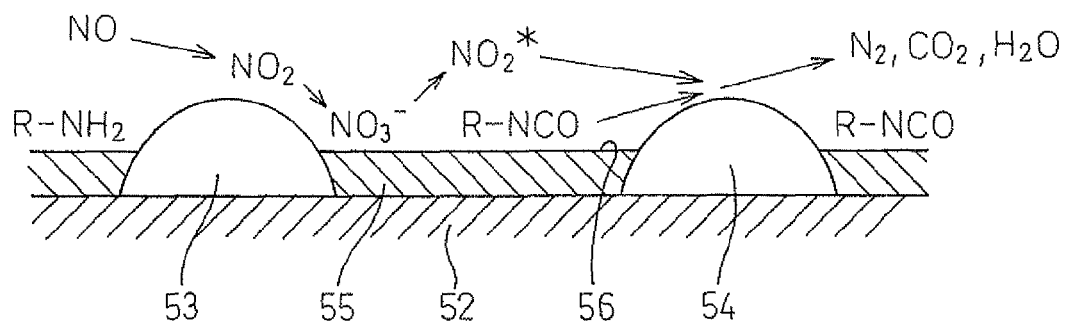

Fig.7
(A)
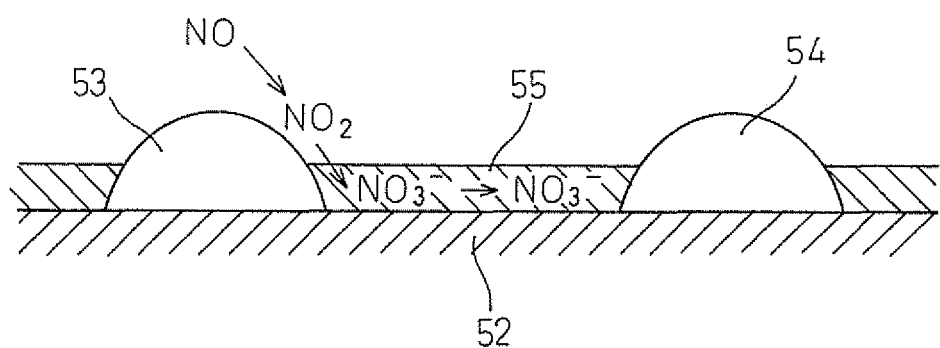
(B)
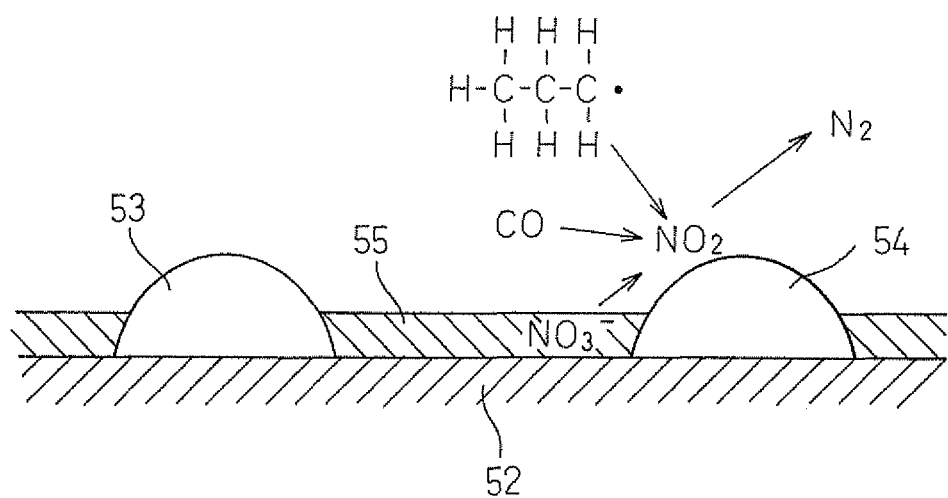

Fig.12
(A)
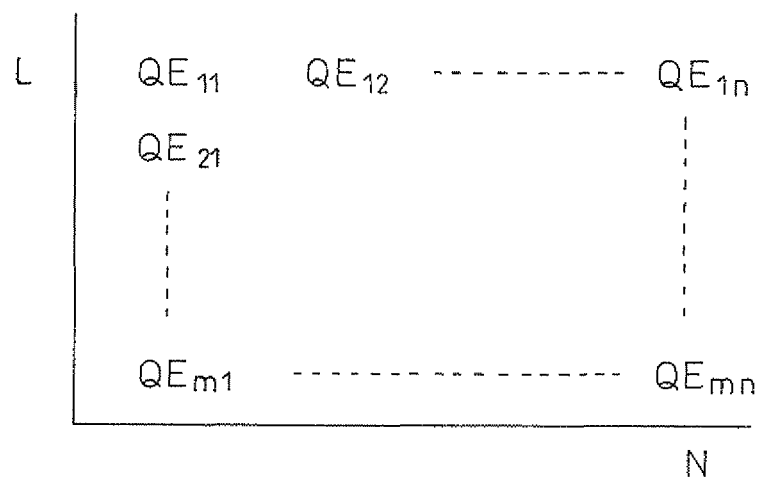
(B)
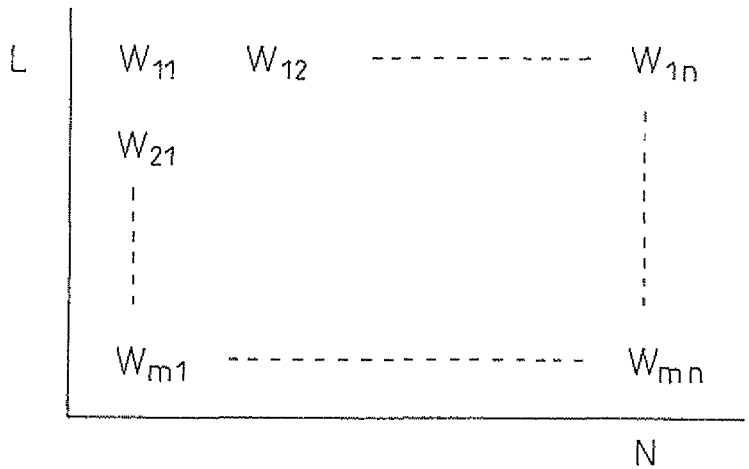

Fig.13
(A)
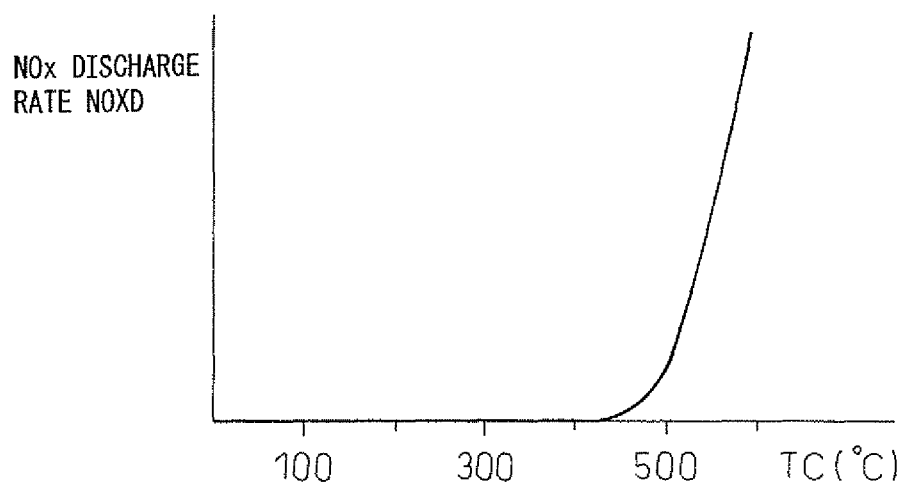
(B)
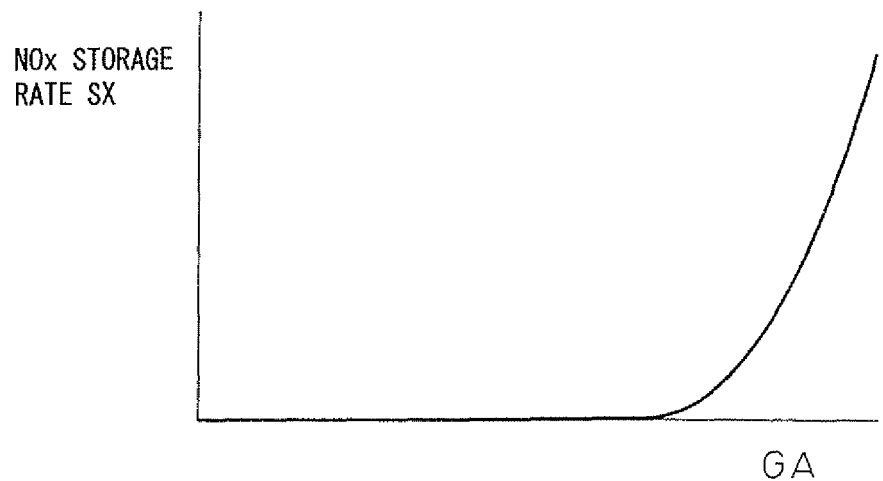

Fig.16
(A)
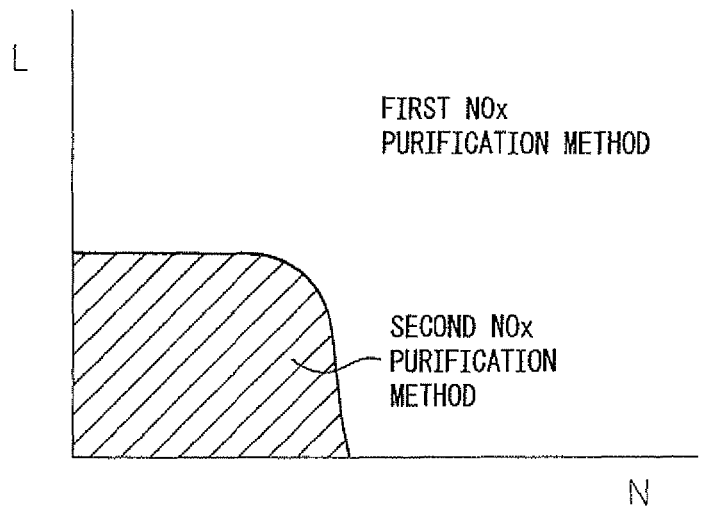
(B)
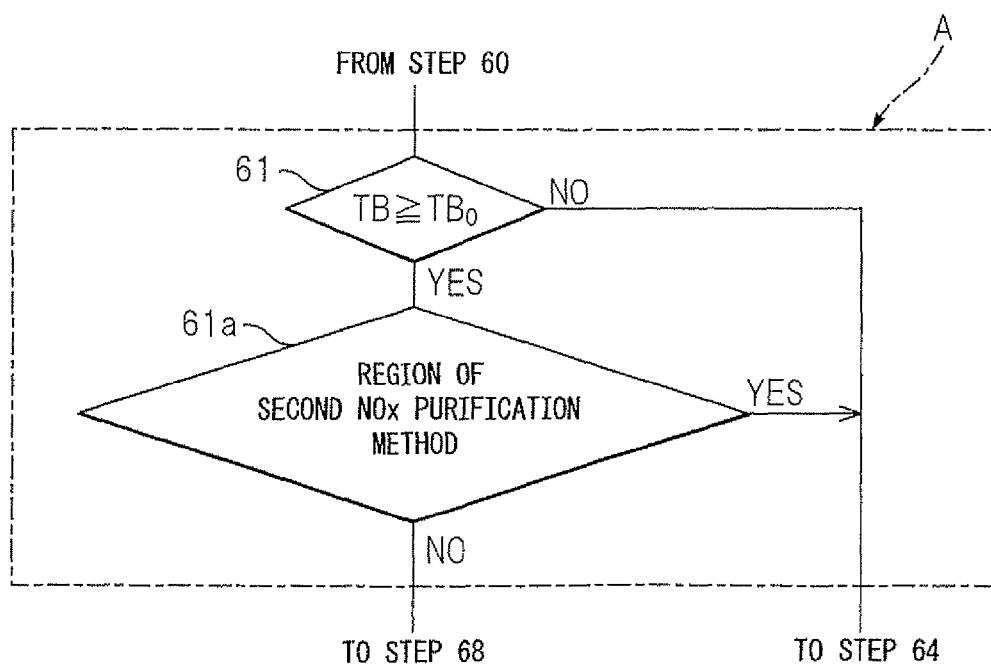

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine wherein a hydrocarbon feed valve for feeding hydrocarbons is arranged inside an engine exhaust passage, an exhaust purification catalyst for reacting $NO_x$ contained in exhaust gas and hydrocarbons which are injected from the hydrocarbon feed valve and are partially oxidized is arranged in the engine exhaust passage downstream of the hydrocarbon feed valve, a precious metal catalyst is carried on the exhaust purification catalyst and a basic layer is formed on the exhaust purification catalyst, the exhaust purification catalyst has a property of reducing the $NO_x$ which is contained in the exhaust gas when hydrocarbons are injected from the hydrocarbon feed valve at predetermined feed intervals while maintaining an air-fuel ratio of an exhaust gas flowing into the exhaust purification catalyst lean and has a property of being increased in storage amount of $NO_x$ which is contained in the exhaust gas when the feed intervals of the hydrocarbons are longer than the predetermined feed intervals, and, at the time of engine operation, a first $NO_x$ purification method which injects hydrocarbons from the hydrocarbon feed valve at the predetermined feed intervals while maintaining the air-fuel ratio of the exhaust gas flowing into the exhaust purification catalyst lean so as to remove the $NO_x$ contained in the exhaust gas and a second $NO_x$ purification method which switches the air-fuel ratio of the exhaust gas which flows to the exhaust purification catalyst from lean to rich by intervals longer than the predetermined feed intervals so as to remove the $NO_x$ are selectively used in accordance with an operating state of an engine.

Advantageous Effects of Invention

By selectively using the first $NO_x$ purification method and the second $NO_x$ purification method, it is possible to obtain a high $NO_x$ purification rate regardless of the operating state of the engine.

BRIEF DESCRIPTION OF DRAWINGS

FIG. 2 is a view schematically showing a surface part of a catalyst carrier.

FIG. 3 is a view for explaining an oxidation reaction in an oxidation catalyst.

FIG. 6 is view for explaining an oxidation reduction reaction in an exhaust purification catalyst.

FIG. 7 is a view for explaining an oxidation reduction reaction in an exhaust purification catalyst.

FIG. 12 is a view showing a map of a hydrocarbon injection amount.

FIG. 13 is a view showing an $NO_x$ discharge rate etc.

FIG. 16 is a view showing a flow chart etc. showing another embodiment of an $NO_x$ purification method determining part A shown in FIG. 15.

DESCRIPTION OF EMBODIMENTS

Figure 1:
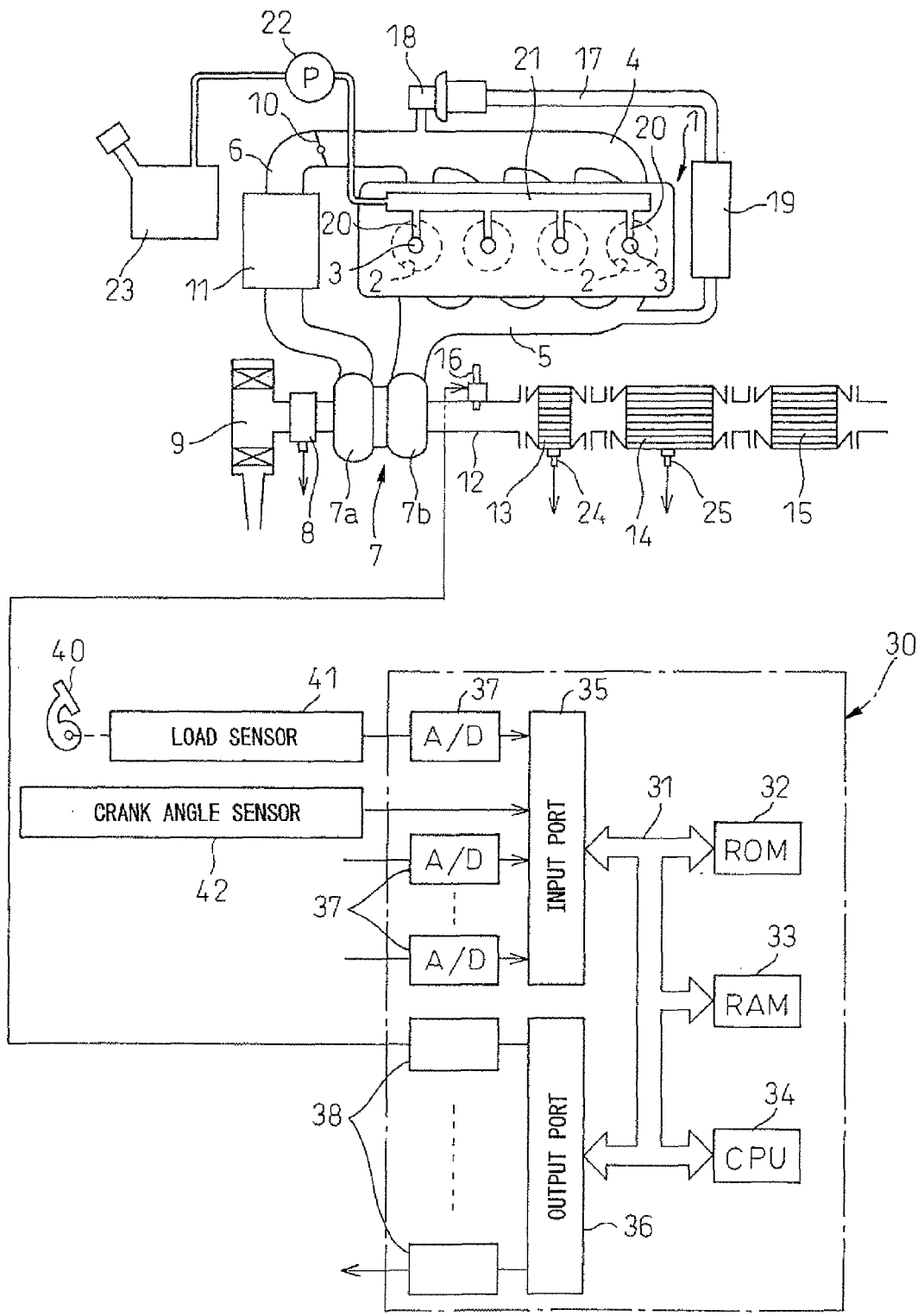
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of the exhaust turbine 7b of the exhaust turbocharger 7, while the outlet of the exhaust turbine 7b is connected through an exhaust pipe 12 to an inlet of a hydrocarbon partial oxidation catalyst 13 able to partially oxidize the hydrocarbons HC. In the embodiment shown in FIG. 1, this hydrocarbon partial oxidation catalyst 13 is comprised of an oxidation catalyst. An outlet of the hydrocarbon partial oxidation catalyst, that is, the oxidation catalyst 13, is connected to an inlet of an exhaust purification catalyst 14, while an outlet of the exhaust purification catalyst 14 is connected to a particulate filter 15 for trapping particulate which is contained in the exhaust gas. Inside of the exhaust pipe 12 upstream of the oxidation catalyst 13, a hydrocarbon feed valve 16 is arranged for feeding hydrocarbons comprised of diesel oil or other fuel used as fuel of a compression ignition type internal combustion engine. In the embodiment shown in FIG. 1, diesel oil is used as the hydrocarbons which are fed from the hydrocarbon feed valve 16. Note that, the present invention can also be applied to a spark ignition type internal combustion engine which burns fuel under a lean air-fuel ratio. In this case, hydrocarbons comprised of gasoline or other fuel which is used as fuel of a spark ignition type internal combustion engine are fed from the hydrocarbon feed valve 16.

On the other hand, the exhaust manifold 5 and the intake manifold 4 are connected with each other through an exhaust gas recirculation (hereinafter referred to as an "EGR") passage 17. Inside the EGR passage 17, a electronically controlled EGR control valve 18 is arranged. Further, around the EGR passage 17, a cooling device 19 is arranged for cooling EGR gas flowing through the inside of the EGR passage 17. In the embodiment shown in FIG. 1, the engine cooling water is guided to the inside of the cooling device 19 where the engine cooling water is used to cool the EGR gas. On the other hand, each fuel injector 3 is connected through a fuel feed tube 20 to a common rail 21. This common rail 21 is connected through an electronically controlled variable discharge fuel pump 22 to a fuel tank 23. The fuel which is stored inside of the fuel tank 23 is fed by the fuel pump 22 to the inside of the common rail 21. The fuel which is fed to the inside of the common rail 21 is fed through each fuel feed tube 20 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. At the oxidation catalyst 13, a temperature sensor 24 is attached for detecting the temperature of the oxidation catalyst 13. At the exhaust purification catalyst 14, a temperature sensor 25 is attached for detecting the temperature of the exhaust purification catalyst 14. The output signals of these temperature sensors 24 and 25 and intake air amount detector 8 are input through corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, the hydrocarbon feed valve 16, the FGR control valve 18, and the fuel pump 22.

FIG. 2(A) schematically shows a surface part of a catalyst carrier carried on a substrate of an oxidation catalyst 13. As shown in FIG. 2(A), for example, a catalyst 51 comprised of platinum Pt or another such precious metal or silver Ag or copper Cu or other such transition metal is carried on a catalyst carrier 50 comprised of alumina.

On the other hand, FIG. 2(B) schematically shows a surface part of a catalyst carrier which is carried on a substrate of the exhaust purification catalyst 14. At this exhaust purification catalyst 14, as shown in FIG. 2(B), for example, there is provided a catalyst carrier 52 made of alumina on which precious metal catalysts 53 and 54 are carried. Furthermore, on this catalyst carrier 52, a basic layer 55 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 53, so the precious metal catalysts 53 and 54 can be said to be carried on the exhaust gas flow surface of the exhaust purification catalyst 14. Further, the surface of the basic layer 55 exhibits basicity, so the surface of the basic layer 55 is called the basic exhaust gas flow surface part 56.

In FIG. 2(B), the precious metal catalyst 53 is comprised of platinum Pt, while the precious metal catalyst 54 is comprised of rhodium Rh. That is, the precious metal catalysts 53 and 54 which are carried on the catalyst carrier 52 are comprised of platinum Pt and rhodium Rh. Note that, on the catalyst carrier 52 of the exhaust purification catalyst 14, in addition to platinum Pt and rhodium Rh, palladium Pd may be further carried or, instead of rhodium Rh, palladium Pd may be carried. That is, the precious metal catalysts 53 and 54 which are carried on the catalyst carrier 52 are comprised of platinum Pt and at least one of rhodium Rh and palladium Pd.

When hydrocarbons are injected from the hydrocarbon feed valve 16 into the exhaust gas, the hydrocarbons are oxidized on the oxidation catalyst 13. In the present invention, at this time, the hydrocarbons are partially oxidized at the oxidation catalyst 13 and the partially oxidized hydrocarbons are used to remove the $NO_x$ at the exhaust purification catalyst 14. In this case, if making the oxidizing strength of the oxidation catalyst 13 too strong, the hydrocarbons end up being oxidized without being partially oxidized at the oxidation catalyst 13. To make the hydrocarbons partially oxidize, it is necessary to weaken the oxidizing strength of the oxidation catalyst 13. Therefore, in an embodiment of the present invention, as an oxidation catalyst 13, a catalyst with a little carried amount of the precious metal catalyst, a catalyst carrying a base metal, or a catalyst with a small volume is used.

FIG. 3 schematically shows an oxidation reaction which is performed in the oxidation catalyst 13. As shown in FIG. 3, the hydrocarbons HC which are injected from the hydrocarbon feed valve 16 become radical hydrocarbons HC with a small carbon number due to the catalyst 51. Note that, at this time, part of the hydrocarbons HC bond with the NO to become nitroso compounds such as shown in FIG. 3, while part of the hydrocarbons HC bond with $NO_2$ to form nitro compounds. These radical hydrocarbons etc. produced at the oxidation catalyst 13 are sent to the exhaust purification catalyst 14.

Next, referring to FIG. 4 to FIG. 6, a first $NO_x$ purification method discovered by the inventors will be explained.

Figure 4:
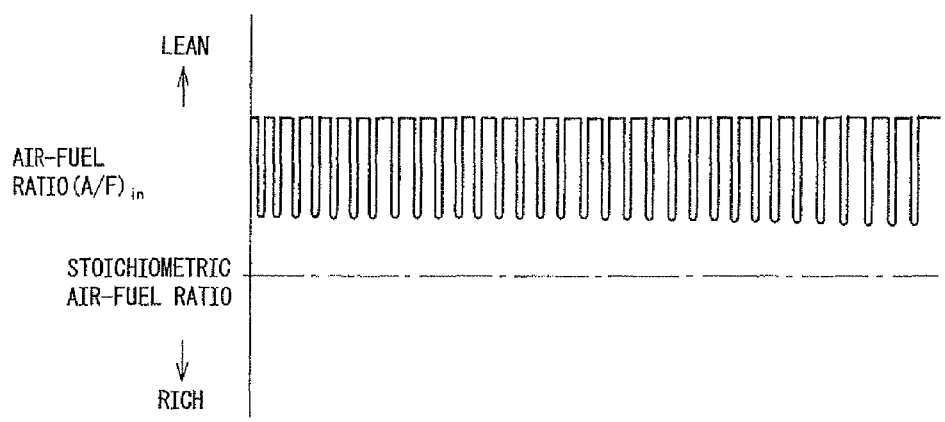
FIG. 4 is a view showing a change of an air-fuel ratio of exhaust gas flowing into an exhaust purification catalyst.
Figure 5:
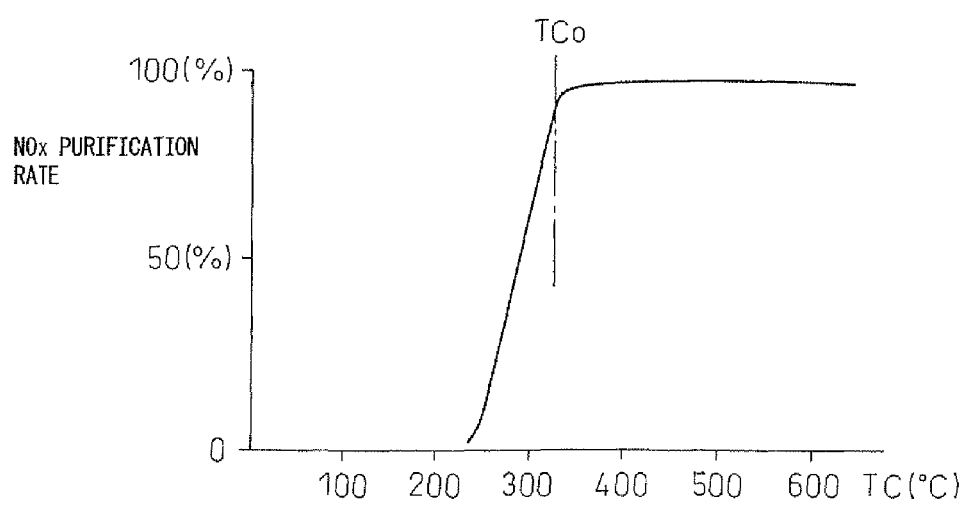
FIG. 5 is a view showing an $NO_x$ purification rate.

Note that, FIG. 4 shows the change in the air-fuel ratio (A/F) in of the exhaust gas flowing into the exhaust purification catalyst 14, while FIG. 5 shows the $NO_x$ purification rate by the exhaust purification catalyst 14 with respect to the catalyst temperatures TC of the exhaust purification catalyst 14 when changing the air-fuel ratio (A/F) in of the exhaust gas flowing to the exhaust purification catalyst 14 as shown in FIG. 4.

Now, the inventors engaged in repeated research on $NO_x$ purification over a long period of time and, in the process of research, learned that, as shown in FIG. 4, if intermittently lowering the air-fuel ratio (A/F) in of the exhaust gas flowing into the exhaust purification catalyst 14 by later explained certain time intervals within a range of a lean air-fuel ratio, an extremely high $NO_x$ purification rate is obtained even in a 400° C. or more high temperature region as shown in FIG. 5. Furthermore, it was learned that, at this time, a large amount of a reducing intermediate containing nitrogen and hydrocarbons continues to be held or adsorbed on the surface of the basic layer 55, that is, on the basic exhaust gas flow surface part 56 of the exhaust purification catalyst 14, and this reducing intermediate plays a central role in obtaining a high $NO_x$ purification rate.

Next, this will be explained with reference to FIGS. 6(A) and 6(B). Note that, these FIGS. 6(A) and 6(B) schematically show the surface part of the catalyst carrier 52 of the exhaust purification catalyst 14. These FIGS. 6(A) and 6(B) show the reaction which is presumed to occur when the air-fuel ratio (A/F) in of the exhaust gas flowing into the exhaust purification catalyst 14 is intermittently reduced within the range of a lean air-fuel ratio as shown in FIG. 4.

That is, as will be understood from FIG. 4, the air-fuel ratio of the exhaust gas flowing into the exhaust purification catalyst 14 is maintained lean, so the exhaust gas which flows into the exhaust purification catalyst 14 becomes a state of oxygen excess. Therefore, the NO which is contained in the exhaust gas, as shown in FIG. 6(A), is oxidized on the platinum 53 and becomes $NO_2$. Next, this $NO_2$ is further oxidized and becomes stable nitrate ions $NO_3^-$.

On the other hand, when nitrates $NO_3^-$ are produced, the nitrates $NO_3^-$ are pulled back in a direction of reduction by the hydrocarbons HC which are sent on to the surface of the basic layer 55, have the oxygen disassociated, and becomes unstable $NO_2^*$. This unstable $NO_2^*$ is strong in activity. Below, this unstable $NO_2^-$ is called the active $NO_2^*$. This active $NO_2^*$, as shown in FIG. 6(A), reacts with the mainly radical hydrocarbons HC which are adhered on the surface of the basic layer 55 or on the rhodium Rh 54 or with the mainly radical hydrocarbons HC contained in the exhaust gas on the rhodium Rh 54, whereby a reducing intermediate is produced. This reducing intermediate is adhered or adsorbed on the surface of the basic layer 55.

Note that, at this time, the first produced reducing intermediate is believed to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6(A), the majority of the reducing intermediate which is held or adsorbed on the surface of the basic layer 55 is believed to be the isocyanate compound R—NCO and amine compound R—$NH_2$.

On the other hand, as shown in FIG. 6(B), the active $NO_2^*$ reacts with the reducing intermediate R—NCO or R—$NH_2$ on the rhodium Rh 54 to form $N_2$, $CO_2$, and $H_2O$ and consequently the $NO_x$ is removed. That is, if no reducing intermediate R—NCO or R—$NH_2$ is held or adsorbed on the basic layer 55, the $NO_x$ is not removed. Therefore, to obtain a high $NO_x$ purification rate, it is necessary to ensure the continuous presence of a sufficient amount of the reducing intermediate R—NCO or R—$NH_2$ for making the active $NO_2^*$ $N_2$, $CO_2$, and $H_2O$ on the basic layer 55, that is, the basic exhaust gas flow surface part 26, at all times.

That is, as shown in FIGS. 6(A) and 6(B), to oxidize the NO on the platinum Pt 53, the air-fuel ratio (A/F) in of the exhaust gas must be lean. It is necessary to hold a sufficient amount of the reducing intermediate R—NCO or R—$NH_2$ for making the produced active $NO_2^*$ $N_2$, $CO_2$, and $H_2O$ on the surface of the basic layer 55, that is, it is necessary to provide the basic exhaust gas flow surface part 26 for holding the reducing intermediate R—NCO or R—$NH_2$.

Therefore, as shown in FIGS. 6(A) and 6(B), to react the $NO_x$ contained in the exhaust gas and the partially oxidized hydrocarbons and produce a reducing intermediate R—NCO or R—$NH_2$ containing nitrogen and hydrocarbon, precious metal catalysts 53 and 54 are carried on the exhaust gas flow surface of the exhaust purification catalyst 14, a basic exhaust gas flow surface part 26 is formed around the precious metal catalysts 53 and 54 to hold the produced reducing intermediate R—NCO or R—$NH_2$ in the exhaust purification catalyst 14, and the $NO_x$ is reduced by the reducing action of the reducing intermediate R—NCO or R—$NH_2$ held on the basic exhaust gas flow surface part 26. Therefore, in this first $NO_x$ purification method, hydrocarbons HC are intermittently fed from the hydrocarbon feed valve 16 by predetermined feed intervals while maintaining the air-fuel ratio of the exhaust gas flowing into the exhaust purification catalyst 14 lean. The predetermined feed intervals of the hydrocarbons HC are made the feed interval required for continuing to ensure the presence of the reducing intermediate R—NCO or R—$NH_2$ on the basic exhaust gas flow surface part 56.

In this case, if the injection amount becomes too large or the injection interval becomes too short, the amount of hydrocarbons becomes excessive and a large amount of hydrocarbons HC is exhausted from the exhaust purification catalyst 14, while if the injection amount becomes too small or the injection interval becomes too long, the reducing intermediate R—NCO or R—$NH_2$ can no longer remain on the basic exhaust gas flow surface part 56. Therefore, in this case, what is important is setting the injection amount and injection interval of hydrocarbons so that so that no excess hydrocarbons HC are exhausted from the exhaust purification catalyst 14 and so that the reducing intermediate R—NCO or the R—NH$_2$ continues on the basic exhaust gas flow surface part 26. Incidentally, in the example shown in FIG. 4, the injection interval is made 3 seconds.

Next, while referring to FIG. 7 to FIG. 11, the second NO$_x$ purification method will be explained. In the case shown in FIG. 4, if making the feed intervals of the hydrocarbons HC longer than the above-mentioned predetermined feed intervals, the hydrocarbons HC and the reducing intermediate R—NCO or R—NH$_2$ disappear from the surface of the basic layer 55. At this time, no pullback force in a direction, which reduces nitrate ions NO$_3^-$, acts on the nitrate ions NO$_3^-$ produced on the platinum Pt 53. Therefore, at this time, the nitrate ions NO$_3^-$ diffuse in the basic layer 55 and becomes nitrates as shown in FIG. 7(A). That is, at this time, the NO$_x$ in the exhaust gas is absorbed in the form of nitrates inside the basic layer 55.

On the other hand, FIG. 7(B) shows the case where the air-fuel ratio of the exhaust gas which flows into the exhaust purification catalyst 14 is made the stoichiometric air-fuel ratio or rich when the NO$_x$ is absorbed in the form of nitrates inside of the basic layer 55. In this case, the oxygen concentration in the exhaust gas falls, so the reaction proceeds in the opposite direction (NO$_3^- \rightarrow$ NO$_2$) and consequently the nitrates absorbed in the basic layer 55 become nitrate ions NO$_3^-$ one by one and, as shown in FIG. 7(B), are released from the basic layer 55 in the form of NO$_2$. Next, the released NO$_2$ is reduced by the hydrocarbons HC and CO contained in the exhaust gas.

Figure 8:
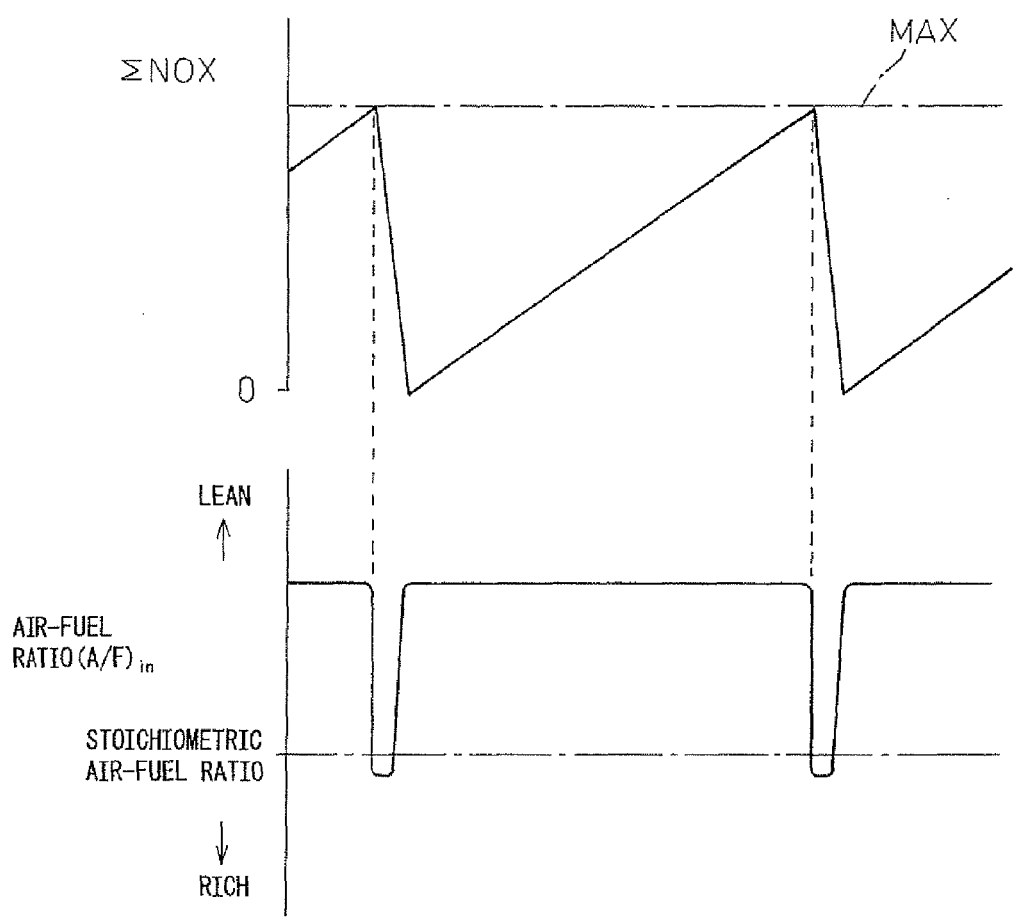
FIG. 8 is a view showing a change of an air-fuel ratio of exhaust gas flowing into an exhaust purification catalyst etc.

FIG. 8 shows a second NO$_x$ purification method utilizing the adsorption and release action of NO$_x$. That is, in this second NO$_x$ purification method, as shown in FIG. 8, when the stored NO$_x$ amount ΣNOX which is stored in the basic layer 55 exceeds a predetermined allowable amount MAX, the air-fuel ratio (A/F) in of the exhaust gas which flows into the exhaust purification catalyst 14 is temporarily made rich. If the air-fuel ratio (A/F) in of the exhaust gas is made rich, the NO$_x$ which was absorbed at the basic layer 55 when the air-fuel ratio (A/F) in of the exhaust gas was lean, is released all at once from the basic layer 55 and reduced. Due to this, the NO$_x$ is removed.

Figure 9:
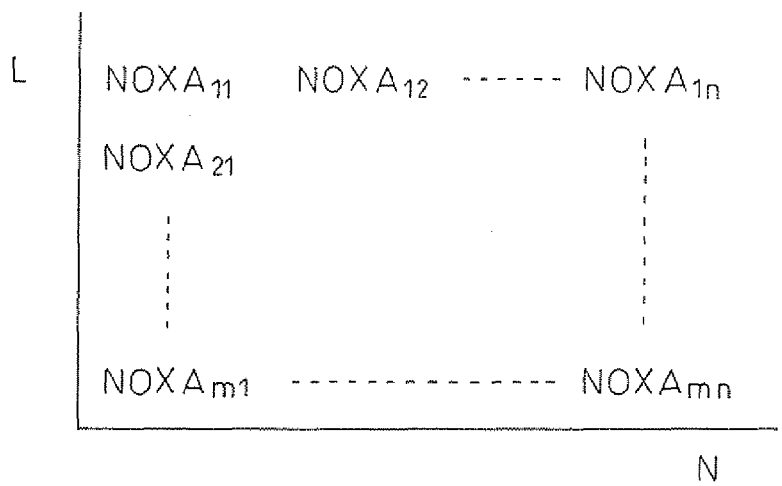
FIG. 9 is a view showing a map of an exhausted $NO_x$ amount NOXA.

The stored NO$_x$ amount ΣNOX is, for example, calculated from the NO$_x$ amount which is exhausted from the engine. In an embodiment of the present invention, the exhausted NO$_x$ amount NOXA which is exhausted from the engine per unit time is stored as a function of the engine load L and engine speed N in the form of a map such as shown in FIG. 9 in advance in the ROM 32. The stored NO$_x$ amount ΣNOX is calculated from this exhausted NO$_x$ amount NOXA. The period by which the air-fuel ratio (A/F) in of the exhaust gas is made rich is far longer than the period by which the air-fuel ratio (A/F) in of the exhaust gas is lowered, as shown in FIG. 4, and the period by which the air-fuel ratio (A/F) in of the exhaust gas is made rich is usually 1 minute or more.

In the second NO$_x$ purification method, when the air-fuel ratio (A/F) in of the exhaust gas is lean, the NO$_x$ which is contained in the exhaust gas is absorbed in the basic layer 55. Therefore, the basic layer 55 performs the role of an absorbent for temporarily absorbing NO$_x$. Note that, at this time, sometimes the basic layer 55 temporarily adsorbs the NO$_x$. Therefore, if using term of storage as a term including both absorption and adsorption, at this time, the basic layer 55 performs the role of an NO$_x$ storage agent for temporarily storing the NO$_x$. That is, if the ratio of the air and fuel (hydrocarbons) which are fed into the engine intake passage, combustion chambers 2, and exhaust passage upstream of the exhaust purification catalyst 14 is called the air-fuel ratio of the exhaust gas, in this second NO$_x$ purification method, the exhaust purification catalyst 14 functions as an NO$_x$ storage catalyst which stores the NO$_x$ when the air-fuel ratio of the exhaust gas is lean and releases the stored NO$_x$ when the oxygen concentration in the exhaust gas falls.

Figure 10:
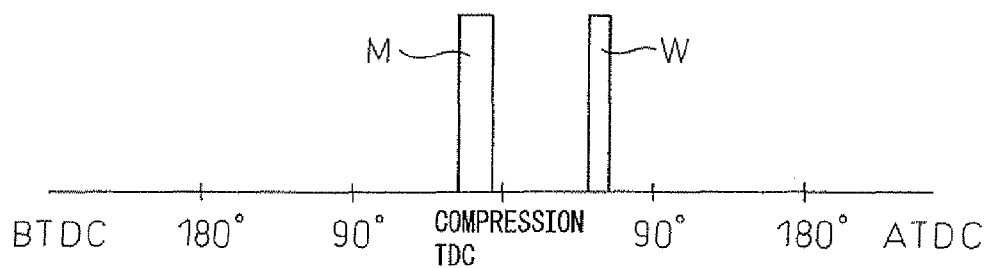
FIG. 10 is a view showing a fuel injection timing.

Further, in this second NO$_x$ purification method, as shown in FIG. 10, in addition to the combustion use fuel M from the fuel injector 3, additional fuel W is injected into the combustion chamber 2 whereby the air-fuel ratio (A/F) in of the exhaust gas flowing into the exhaust purification catalyst 14 is made rich. Note that, the abscissa of FIG. 10 shows the crank angle. This additional fuel W is injected at a timing where it is burned, but does not appear as engine output, that is, slightly before ATDC90° after compression top dead center. Of course, in this case, it is also possible to make the feed amount of hydrocarbons from the hydrocarbon feed valve 16 increase so as to make the air-fuel ratio (A/F) in of the exhaust gas rich.

Figure 11:
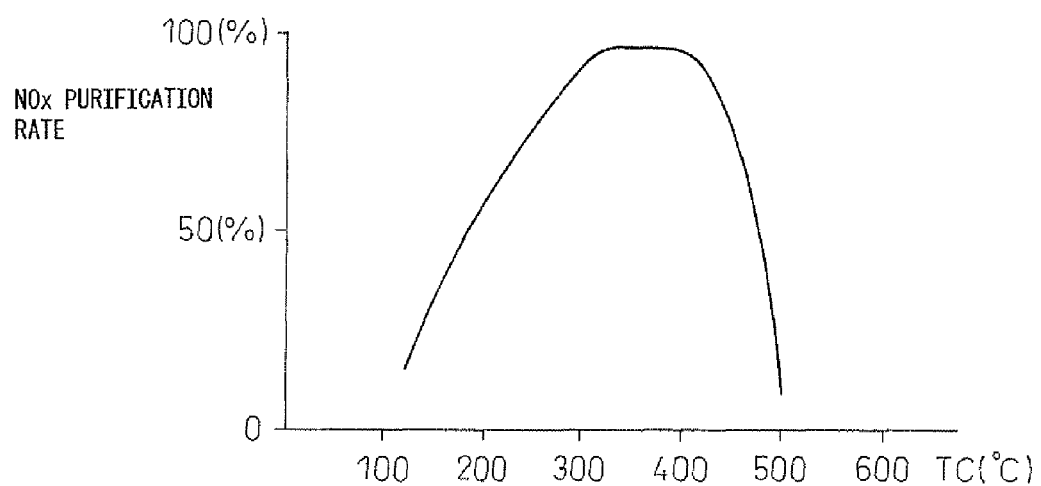
FIG. 11 is a view showing an $NO_x$ purification rate.

FIG. 11 shows the NO$_x$ purification rate when making the exhaust purification catalyst 14 function as an NO$_x$ storage catalyst. Note that, the abscissa of the FIG. 11 shows the catalyst temperature TC of the exhaust purification catalyst 14. When making the exhaust purification catalyst 14 function as an NO$_x$ storage catalyst, as shown in FIG. 11, when the catalyst temperature TC is 300° C. to 400° C., an extremely high NO$_x$ purification rate is obtained, but when the catalyst temperature TC becomes a 400° C. or higher high temperature, the NO$_x$ purification rate falls.

In this way, when the catalyst temperature TC becomes 400° C. or more, the NO$_x$ purification rate falls because if the catalyst temperature TC becomes 400° C. or more, the nitrates break down by heat and are released in the form of NO$_2$ from the exhaust purification catalyst 14. That is, so long as storing NO$_x$ in the form of nitrates, when the catalyst temperature TC is high, it is difficult to obtain a high NO$_x$ purification rate. However, in the first NO$_x$ purification method shown from FIG. 4 to FIGS. 6(A) and 6(B), as will be understood from FIGS. 6(A) and 6(B), nitrates are not formed or even if formed are extremely fine in amount, consequently, as shown in FIG. 5, even when the catalyst temperature TC is high, a high NO$_x$ purification rate is obtained.

That is, the first NO$_x$ purification method shown from FIG. 4 to FIGS. 6(A) and 6(B) can be said to be a new NO$_x$ purification method which removes NO$_x$ without formation of almost any nitrates when using an exhaust purification catalyst which carries a precious metal catalyst and forms a basic layer which can absorb NO$_x$. In actuality, when using this first NO$_x$ purification method, the nitrates which are detected from the basic layer 53 become much smaller in amount compared with the case of using the second NO$_x$ purification method.

On the other hand, to use the first NO$_x$ purification method to remove NO$_x$, it is necessary to feed a certain amount or more of hydrocarbons by a short period even when the NO$_x$ concentration in the exhaust gas is low. Therefore, when the NO$_x$ concentration of the exhaust gas is low, the NO$_x$ purification efficiency deteriorates. As opposed to this, in the second NO$_x$ purification method, when the NO$_x$ concentration in the exhaust gas is low, the time until the stored NO$_x$ amount ΣNOX reaches the allowable value MAX becomes longer, and thus the period for making the air-fuel ratio (A/F) in of the exhaust gas rich become longer. Accordingly, the NO$_x$ purification efficiency does not become poor. Therefore, when the NO$_x$ concentration in the exhaust gas is low, it can be said to be preferable to use the second NO$_x$ purification method rather than the first NO$_x$ purification method.

That is, which of the first NO$_x$ purification method and the second NO$_x$ purification method should be used changes in the operating state of the engine. Therefore, in the present invention, on the exhaust purification catalyst 14, precious metal catalysts 53 and 54 are carried and a basic layer 55 is formed, and the exhaust purification catalyst 14 has the property of reducing the $NO_x$ which is contained in the exhaust gas when hydrocarbons are injected from the hydrocarbon feed valve 16 at predetermined feed intervals while maintaining the air-fuel ratio of the exhaust gas flowing into the exhaust purification catalyst 14 is maintained lean and has the property of being increased in the storage amount of $NO_x$ which is contained in exhaust gas when the feed intervals of the hydrocarbons are made longer than the predetermined feed intervals. At the time of engine operation, a first $NO_x$ purification method which injects hydrocarbons from the hydrocarbon feed valve 16 at the predetermined feed intervals while maintaining the air-fuel ratio of the exhaust gas flowing into the exhaust purification catalyst 14 lean so as to remove the $NO_x$ contained in the exhaust gas and a second $NO_x$ purification method which switches the air-fuel ratio of the exhaust gas which flows to the exhaust purification catalyst 14 from lean to rich by intervals longer than the predetermined feed intervals so as to remove the $NO_x$ are selectively used in accordance with the operating state of the engine.

Next, referring to FIG. 12 to FIG. 15, a representative embodiment according to the present invention will be explained.

FIG. 12(A) shows the hydrocarbon feed amount QE from the hydrocarbon feed valve 16, while FIG. 12(B) shows the additional fuel amount W which is fed into a combustion chamber 2. The hydrocarbon feed amount QE is stored as a function of the engine load QE and engine speed N in the form of a map such as shown in FIG. 12(A) in advance in the ROM 32. The additional fuel amount W is also stored as a function of the engine load QE and engine speed N in the form of a map such as shown in FIG. 12(B) in advance in the ROM 32.

FIG. 13(A) shows a discharge rate NOXD of stored $NO_x$ which is discharged from the exhaust purification catalyst 14 when the air-fuel ratio (A/F) in of the exhaust gas is lean. As explained above, the $NO_x$ which is stored in the form of nitrates is broken down by heat and discharged if the temperature TC of the exhaust purification catalyst 14 rises. At this time, the $NO_x$ discharge rate NOXD, that is, the $NO_x$ amount NOXD which is discharged per unit time, rapidly rises when the temperature TC of the exhaust purification catalyst 14 exceeds the heat breakdown start temperature of about 450° C.

On the other hand, FIG. 13(B) shows the storage rate SX of the $NO_x$ which is stored in the exhaust purification catalyst 14 when the first $NO_x$ purification method is used to perform the purification action of $NO_x$. When the first $NO_x$ purification method is used to perform the purification action of $NO_x$, normally $NO_x$ is not stored in the exhaust purification catalyst 14. However, if the flow rate of the exhaust gas becomes faster, that is, if the intake air amount GA increases, the reaction time becomes shorter and the reaction can no longer be sufficiently performed, so active $NO_2^*$ is not formed and the $NO_x$ which is absorbed at the basic layer 55 increases. Therefore, as shown in FIG. 13(B), when the intake air amount GA becomes larger than a certain value, the $NO_x$ storage rate SX starts to increase.

In this way, even when the first $NO_x$ purification method is used to perform an $NO_x$ purification action, sometimes $NO_x$ is stored in the exhaust purification catalyst 14. At this time, the amount of $NO_x$ stored per unit time becomes the value SX·NOXA of the $NO_x$ storage rate SX multiplied with the $NO_x$ amount NOXA exhausted per unit time. In an embodiment of the present invention, SX·NOXA is cumulatively added to calculate the stored $NO_x$ amount which is stored when the first $NO_x$ purification method is used to perform the $NO_x$ purification action. When switched from the first $NO_x$ purification method to the second $NO_x$ purification method, the stored $NO_x$ amount which is calculated at the time of the first NO purification method is used as the basis to start to calculate the stored $NO_x$ amount.

That is, in a representative example according to the present invention, when switched from the first $NO_x$ purification method to the second $NO_x$ purification method, the $NO_x$ storage amount which was calculated when the first $NO_x$ purification method is used and the $NO_x$ storage amount which was calculated after switching to the second $NO_x$ purification method are totaled up. When this total value ΣNOX exceeds a predetermined allowable value MAX, the air-fuel ratio of the exhaust gas flowing into the exhaust purification catalyst 14 is made temporarily rich. In this case, if ignoring the stored $NO_x$ amount of the time when using the first $NO_x$ purification method, the timing at which the air-fuel ratio (A/F) in of the exhaust gas is made rich when switched to the second $NO_x$ purification method becomes slower and consequently part of the $NO_x$ is exhausted into the atmosphere without being stored. However in an embodiment of the present invention, the $NO_x$ storage amount of the time when the first $NO_x$ purification method is used is taken into consideration. Therefore, the above such problem does not arise.

On the other hand, when switched from the second $NO_x$ purification method to the first $NO_x$ purification method, if stored $NO_x$ remains in the exhaust purification catalyst 14, the stored $NO_x$ is discharged from the $NO_x$ purification catalyst 14 when the temperature TC of the exhaust purification catalyst 14 is caused to rise due to the feed of hydrocarbons. When an $NO_x$ purification action is performed by the first $NO_x$ purification method, no reducing action is performed on the thus discharged $NO_x$, consequently the $NO_x$ is exhausted into the atmosphere.

However, if making the air-fuel ratio (A/F) in of the exhaust gas rich, it is possible to reduce the stored $NO_x$ which remained in the exhaust purification catalyst 14 and consequently possible to block the $NO_x$ from being exhausted into the atmosphere. Therefore, in an embodiment of the present invention, as shown in FIG. 14, when switched from the second $NO_x$ purification method to the first $NO_x$ purification method, the air-fuel ratio of the exhaust gas which flows into the exhaust purification catalyst 14 is temporarily made rich to release and reduce the $NO_x$ which was stored in the exhaust purification catalyst 14.

Figure 14:
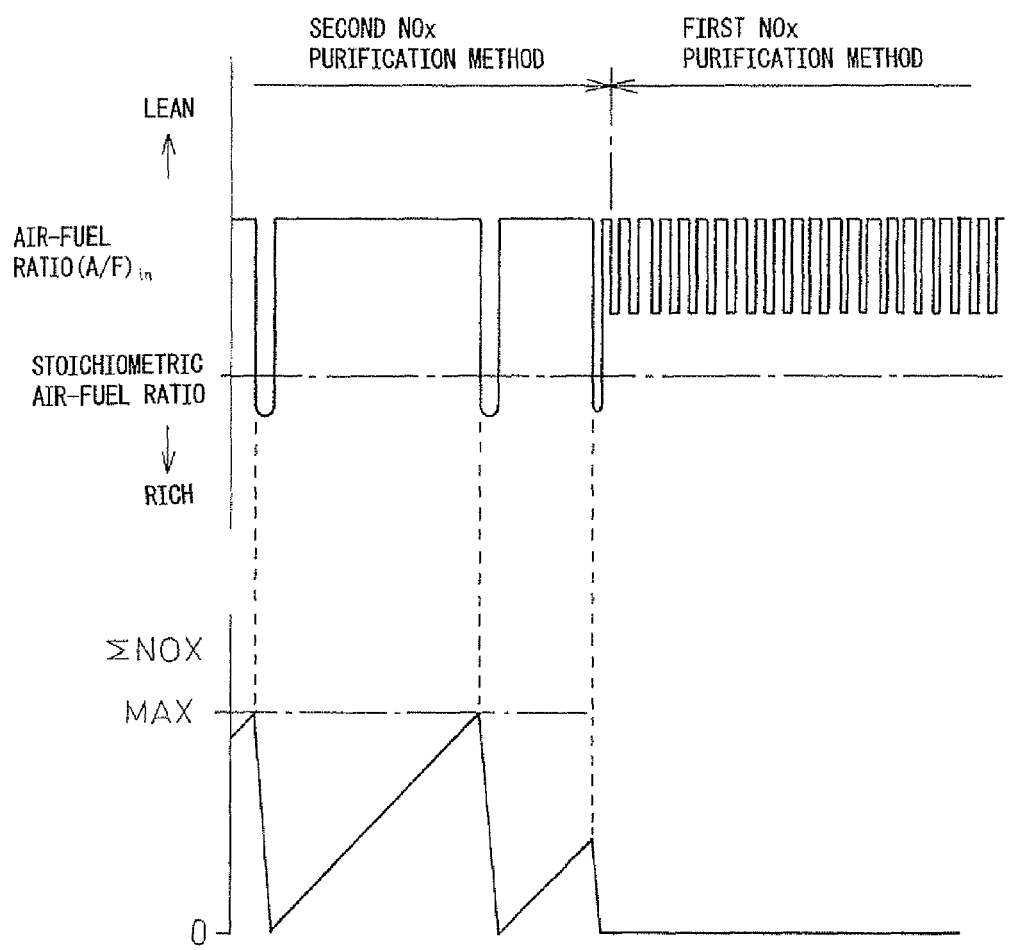
FIG. 14 is a view showing a change in an air-fuel ratio of exhaust gas (A/F) in etc. when switching from a second $NO_x$ purification method to a first $NO_x$ purification method.

In this case, in the embodiment shown in FIG. 14, right before being switched from the second $NO_x$ purification method to the first $NO_x$ purification method, additional fuel W is fed into the combustion chamber 2 whereby the air-fuel ratio of the exhaust gas which flows into the exhaust purification catalyst 14 is made rich. Note that, FIG. 14 shows the change of the air-fuel ratio (A/F) in of the exhaust gas which flows into the exhaust purification catalyst 14 and the stored $NO_x$ amount ΣNOX which is stored in the exhaust purification catalyst 14. As will be understood from FIG. 14, when the first $NO_x$ purification method is started, the stored $NO_x$ amount ΣNOX becomes zero and consequently $NO_x$ is kept from being exhausted into the atmosphere.

On the other hand, the $NO_x$ purification action by the first $NO_x$ purification method is not performed so long as the oxidation catalyst 13 is not activated. Therefore, in an embodiment of the present invention, the first $NO_x$ purification method is used only when the temperature TB of the oxidation catalyst 13 becomes the activation temperature $TB_0$ or more. When the temperature TB of the oxidation catalyst 13 is lower than the activation temperature $TB_0$, use of the first $NO_x$ purification method is prohibited. At this time, that is, when the temperature TB of the oxidation catalyst 13 is lower than the activation temperature $TB_0$, the second $NO_x$ purification method is used.

Note that, in a representative embodiment of the present invention, when the temperature TB of the oxidation catalyst 13 is the activation temperature $TB_0$ or more, either of the first $NO_x$ purification method or the second $NO_x$ purification method is used. In this case, when using the first $NO_x$ purification method would result in a higher $NO_x$ purification efficiency compared with using the second $NO_x$ purification method, the first $NO_x$ purification method is used, while when using the second $NO_x$ purification method would result in a higher $NO_x$ purification efficiency compared with using the first $NO_x$ purification method, the second $NO_x$ purification method is used.

Figure 15:
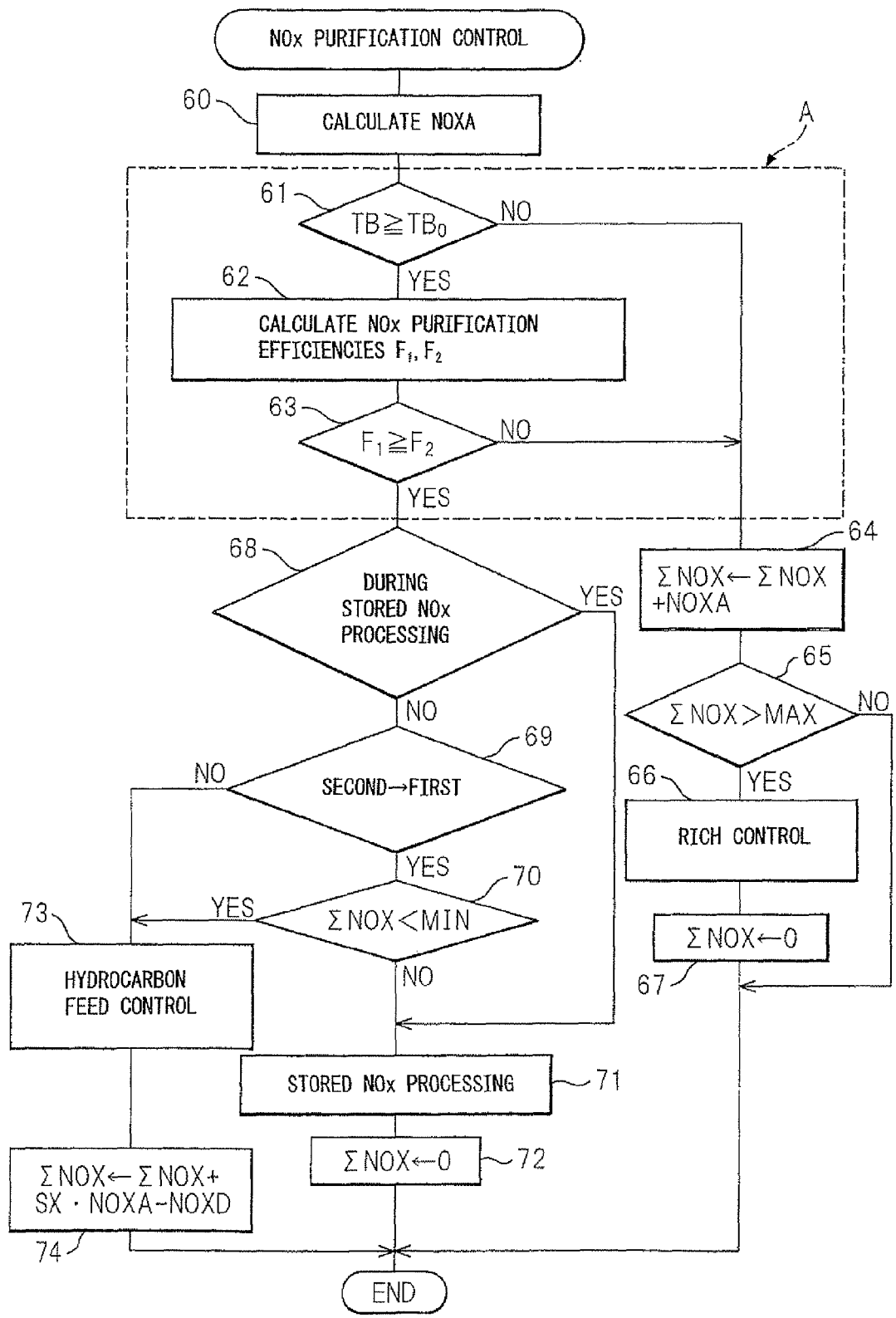
FIG. 15 is a flow chart for $NO_x$ purification control.

FIG. 15 shows the $NO_x$ purification control routine for executing the representative embodiment of the present invention. This routine is executed by interruption every predetermined time interval.

Referring to FIG. 15, first, at step 60, the $NO_x$ amount NOXA exhaust per unit time is calculated from the map shown in FIG. 9. Next, the routine proceeds to an $NO_x$ purification method determining part A for determining whether to use the first $NO_x$ purification method or use the second $NO_x$ purification method. With this $NO_x$ purification method determination part A, first, at step 61, it is judged if the temperature TB of the oxidation catalyst 13 is the activation temperature $TB_0$ or more. When $TB<TB_0$, it is judged that the second $NO_x$ purification method should be used. At this time, the routine proceeds to step 64.

As opposed to this, when $TB \geq TB_0$, the routine proceeds to step 62 where the $NO_x$ purification efficiency $F_1$ when using the first $NO_x$ purification method and the $NO_x$ purification efficiency $F_2$ when using the second $NO_x$ purification method are calculated. The $NO_x$ purification efficiencies $F_1$ and $F_2$ express the amounts of consumption of fuel or hydrocarbons per unit time required for obtaining a unit $NO_x$ purification rate. In this case, the $NO_x$ purification efficiency $F_1$ is calculated from the hydrocarbon feed amount QE and hydrocarbon injection interval shown in FIG. 12A and the $NO_x$ purification rate shown in FIG. 5, while the $NO_x$ purification efficiency $F_2$ is calculated from the additional fuel amount W shown in FIG. 12B, the interval between timings where the rich air-fuel ratio is set in FIG. 8, and the $NO_x$ purification rate shown in FIG. 11.

Next, at step 63, it is judged if the $NO_x$ purification efficiency $F_1$ is higher than the $NO_x$ purification efficiency $F_2$. When $F_1 \geq F_2$, it is judged that the first $NO_x$ purification method should be used. At this time, the routine proceeds to step 68. As opposed to this, when $F_1 < F_2$, it is judged that the second $NO_x$ purification method should be used, and the routine proceeds to step 64.

Next, the second $NO_x$ purification method which is performed from step 64 to step 67 will be explained. First, at step 64, the exhausted $NO_x$ amount NOXA shown in FIG. 9 is added to $\Sigma$NOX to calculate the stored $NO_x$ amount $\Sigma$NOX. Next, at step 65, it is judged if the stored $NO_x$ amount $\Sigma$NOX exceeds the allowable value MAX. When $\Sigma$NOX>MAX, the routine proceeds to step 66 where the additional fuel amount W is calculated from the map shown in FIG. 12B, then the additional fuel injection action is performed. Next, at step 67, $\Sigma$NOX is cleared.

Next, the first $NO_x$ purification method which is performed from step 68 to step 74 will be explained. First, at step 68, it is judged if stored $NO_x$ processing is being performed for processing the stored $NO_x$ remaining inside the exhaust purification catalyst 14. When stored $NO_x$ processing is not being performed, the routine proceeds to step 69 where it is judged if a decision to switch from the second $NO_x$ purification method to the first $NO_x$ purification method has now been made. If a decision to switch from the second $NO_x$ purification method to the first $NO_x$ purification method has now been made, the routine proceeds to step 70 where it is judged if the stored $NO_x$ amount $\Sigma$NOX is smaller than a predetermined small value MIN.

When $\Sigma$NOX>MIN, the routine proceeds to step 71 where stored $NO_x$ processing is performed. In this embodiment, as shown in FIG. 14, right before being switched from the second $NO_x$ purification method to the first $NO_x$ purification method, the air-fuel ratio (A/F) in of the exhaust gas is temporarily made rich. Next, at step 72, $\Sigma$NOX is cleared. Note that, when the stored $NO_x$ processing has started, the routine jumps from step 68 to step 71 until the stored $NO_x$ processing is completed.

On the other hand, when it is judged at step 69 that a decision to switch from the second $NO_x$ purification method to the first $NO_x$ purification method has not now been made, the routine proceeds to step 73. Further, when it is judged at step 70 that $\Sigma$NOX<MIN, that is, even when it is judged that almost no $NO_x$ is stored, the routine proceeds to step 73. At step 73, the hydrocarbon feed amount QE is calculated from the map such as shown in FIG. 12(A), so hydrocarbon injection processing is performed. Next, at step 74, the following formula is used as the basis to calculate the $NO_x$ amount $\Sigma$NOX which is stored in the exhaust purification catalyst 14 during an $NO_x$ purification action by the first $NO_x$ purification method.

$$\Sigma NOX \leftarrow \Sigma NOX + SX \cdot NOXA - NOXD$$

where, SX·NOXA, as explained above, is the $NO_x$ amount which is stored per unit time and NOXD is the discharge rate shown in FIG. 13A. When switched from the first $NO_x$ purification method to the second $NO_x$ purification method, at step 64, NOXA is added to the $\Sigma$NOX calculated at step 74.

FIG. 16 shows another embodiment. In this embodiment, the engine operating region where the $NO_x$ purification efficiency $F_2$ becomes higher than the $NO_x$ purification efficiency $F_1$ is set in advance as shown by the hatching in FIG. 16(A), for example, as a function of the engine load L and engine speed N. When the oxidation catalyst 13 is activated, the $NO_x$ purification method is determined in accordance with FIG. 16(A).

FIG. 16(B) shows another embodiment of the $NO_x$ purification method determining part A of FIG. 15. Referring to FIG. 16(B), at step 61, when the temperature TB of the oxidation catalyst 13 is lower than the activation temperature $TB_0$, it is judged that the second $NO_x$ purification method should be used, then the routine proceeds to step 64 of FIG. 15. As opposed to this, when it is judged at step 61 that $TB \geq TB_0$, the routine proceeds to step 61a where it is judged if the operating state of the engine is a region shown by the hatching in FIG. 16(A) where the second $NO_x$ purification method should be used. When the operating state of the engine is a region where the second $NO_x$ purification method should be used, the routine proceeds to step 64 of FIG. 15. As opposed to this, when it is judged that the operating state of the engine is not a region where the second $NO_x$ purification method should be used, the routine proceeds to step 68 of FIG. 15.

Figure 17:
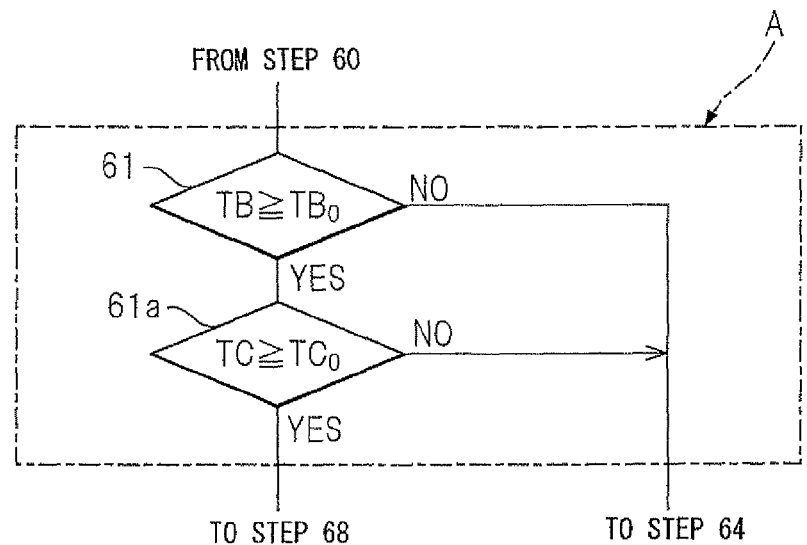
FIG. 17 is a view showing a flow chart etc. showing still another embodiment of an $NO_x$ purification method determining part A shown in FIG. 15.

FIG. 17 shows still another embodiment of the $NO_x$ purification method determining part A of FIG. 15. That is, the $NO_x$ purification rate when using the first $NO_x$ purification method, as shown in FIG. 5, is rapidly lowered when the temperature TC of the exhaust purification catalyst 14 becomes the limit temperature $TC_0$ or less. As opposed to this, as shown in FIG. 11, the $NO_x$ purification rate when using the second $NO_x$ purification method falls relatively slowly when the temperature TC of the exhaust purification catalyst 14 falls. Therefore, in this embodiment, when the temperature TC of the exhaust purification catalyst 14 is higher than the limit temperature $TC_0$ the first $NO_x$ purification method is used, while when the temperature TC of the exhaust purification catalyst 14 is lower than the limit temperature $TC_0$ the second $NO_x$ purification method is used.

That is, referring to FIG. 17, at step 61, when the temperature TB of the oxidation catalyst 13 is lower than the activation temperature $TB_0$, it is judged that the second $NO_x$ purification method should be used then the routine proceeds to step 64 of FIG. 15. As opposed to this, when it is judged at step 61 that $TB \geq TB_0$, the routine proceeds to step 61a where it is judged if the temperature TC of the exhaust purification catalyst 14 is higher than the limit temperature $TC_0$. When $TC<T_0$, the routine proceeds to step 64 of FIG. 15. As opposed to this, when $TC \geq T_0$, it is judged that the first $NO_x$ purification method should be used then the routine proceeds to step 68 of FIG. 15.

Figure 18:
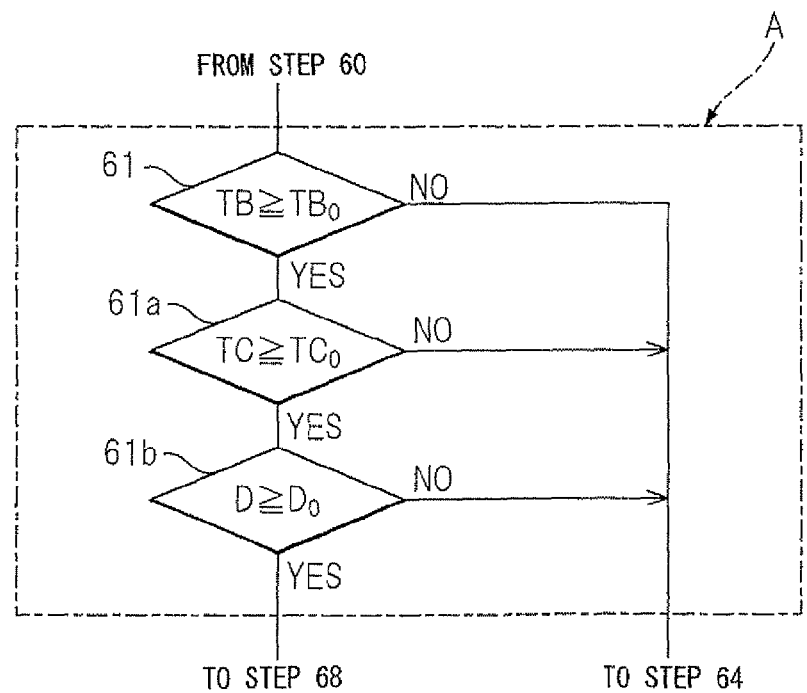
FIG. 18 is a view showing a flow chart etc. showing another embodiment of an $NO_x$ purification method determining part A shown in FIG. 15.

FIG. 18 shows still another embodiment of the $NO_x$ purification method determining part A of FIG. 15. That is, the first $NO_x$ purification method can give a high $NO_x$ purification rate as compared with the second $NO_x$ purification method when the $NO_x$ amount to be reduced is large, that is, when the $NO_x$ concentration in the exhaust gas is high. Therefore, in this embodiment, it is judged whether to use the first $NO_x$ purification method or to use the second $NO_x$ purification method by whether the $NO_x$ concentration D in the exhaust gas exceeds a set value $D_0$.

That is, referring to FIG. 18, at step 61, when the temperature TB of the oxidation catalyst 13 is lower than the activation temperature $TB_0$, it is judged that the second $NO_x$ purification method should be used, then the routine proceeds to step 64 of FIG. 15. As opposed to this, when it is judged at step 61 that $TB \geq TB_0$, the routine proceeds to step 61a where it is judged if the temperature TC of the exhaust purification catalyst 14 is higher than the limit temperature $TC_0$. When $TC<T_0$, the routine proceeds to step 64 of FIG. 15. As opposed to this, when $TC \geq T_0$, the routine proceeds to step 61b where it is judged if the $NO_x$ concentration D in the exhaust gas which is detected by for example, the $NO_x$ concentration sensor is higher than the set value $D_0$. When $D<D_0$, the routine proceeds to step 64 of FIG. 15. As opposed to this, when $D \geq D_0$, it is judged that the first $NO_x$ purification method should be used, then the routine proceeds to step 68 of FIG. 15.

Figure 19:
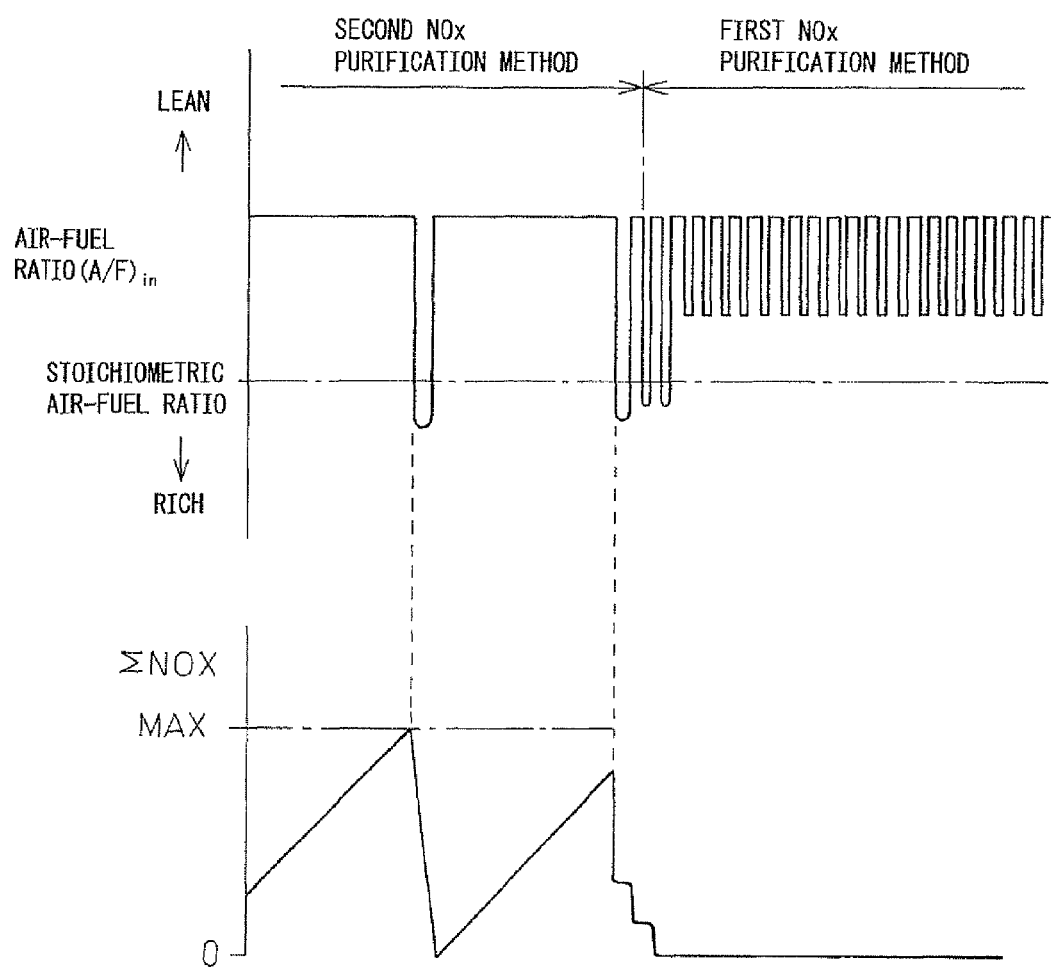
FIG. 19 is a timing chart showing a change in an air-fuel ratio of exhaust gas (A/F) in etc. when switching from a second $NO_x$ purification method to a first $NO_x$ purification method.

FIG. 19 shows another embodiment of the stored $NO_x$ processing which is performed at step 71 of FIG. 15. In this embodiment, right after being switched from the second $NO_x$ purification method to the first $NO_x$ purification method as well, the air-fuel ratio (A/F) in of the exhaust gas flowing into the exhaust purification catalyst 14 is made rich. At this time, the amount of hydrocarbons which is fed from the hydrocarbon feed valve 16 is increased so that the air-fuel ratio (A/F) in of the exhaust gas is made rich.

That is, when a decision has been made to switch from the second $NO_x$ purification method to the first $NO_x$ purification method, if the stored $NO_x$ amount $\Sigma NOX$ is large, if just injecting additional fuel to the inside of the combustion chamber 2 so as to make air-fuel ratio (A/F) in of the exhaust gas rich just once, sometimes it is not possible to release the total stored $NO_x$ for reduction. In such a case, as shown in FIG. 19, when the $NO_x$ purification action by the first $NO_x$ purification method is started, by increasing the feed amount of hydrocarbons, the air-fuel ratio (A/F) in of the exhaust gas is made rich whereby the total stored $NO_x$ is released and reduced.

On the other hand, if injecting additional fuel into the combustion chamber 2, the temperature inside the combustion chamber 2 rises. Therefore, at the time of a high load operation where the combustion temperature becomes higher, sometimes the air-fuel ratio (A/F) in of the exhaust gas cannot be made rich by injecting the additional fuel into the combustion chamber 2. In such a case, the air-fuel ratio (A/F) in of the exhaust gas is made rich by stopping the injection of the additional fuel and increasing the feed amount of hydrocarbons.

Figure 20:
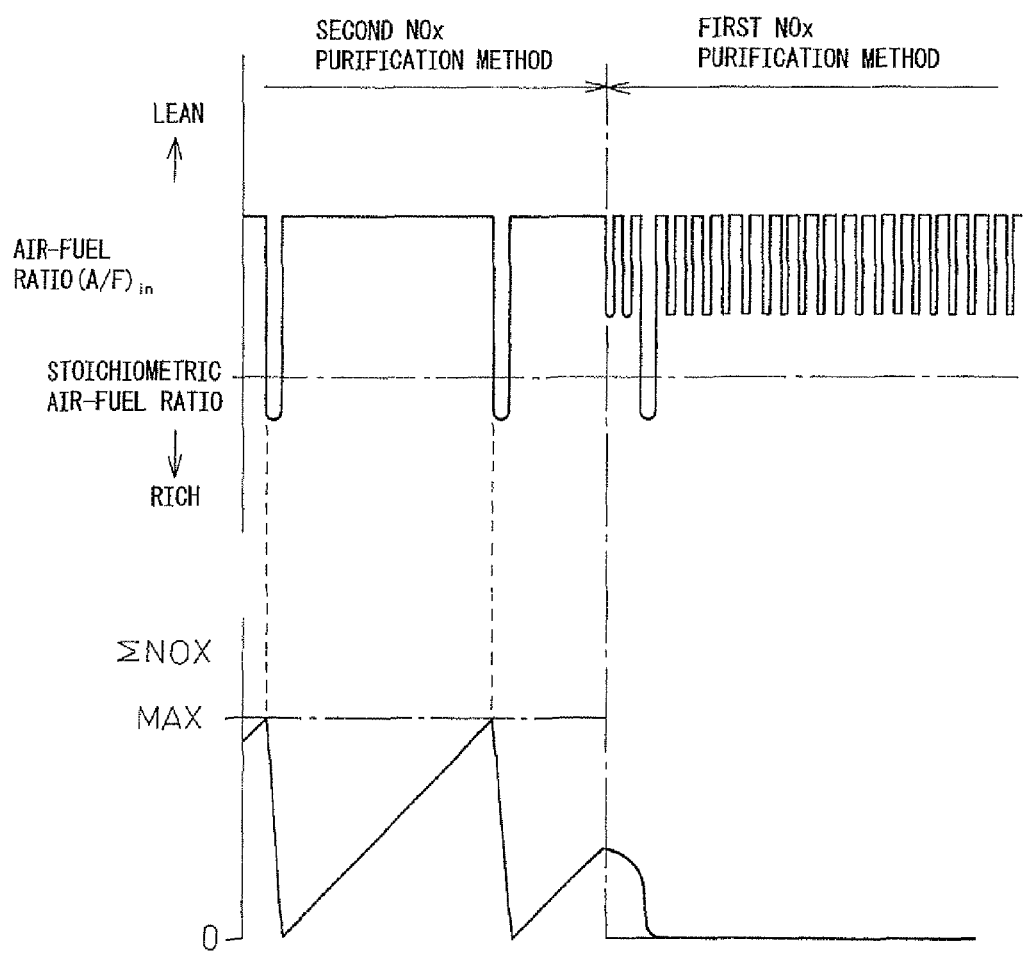
FIG. 20 is a timing chart showing a change in an air-fuel ratio of exhaust gas (A/F) in etc. when switching from a second $NO_x$ purification method to a first NO purification method.

FIG. 20 shows still another embodiment of the stored $NO_x$ processing which is performed at step 71 of FIG. 15. In this embodiment, after being switched from the second $NO_x$ purification method to the first $NO_x$ purification method, the $NO_x$ purification action is started by the first $NO_x$ purification method, then the air-fuel ratio (A/F) in of the exhaust gas flowing into the exhaust purification catalyst 14 is made rich. In this embodiment, when the stored $NO_x$ is discharged from the exhaust purification catalyst 14, this discharged $NO_x$ is reduced by feeding additional fuel to the combustion chamber 2 or increasing the feed amount of hydrocarbons to make the air-fuel ratio (A/F) in of the exhaust gas rich.

Figure 21:
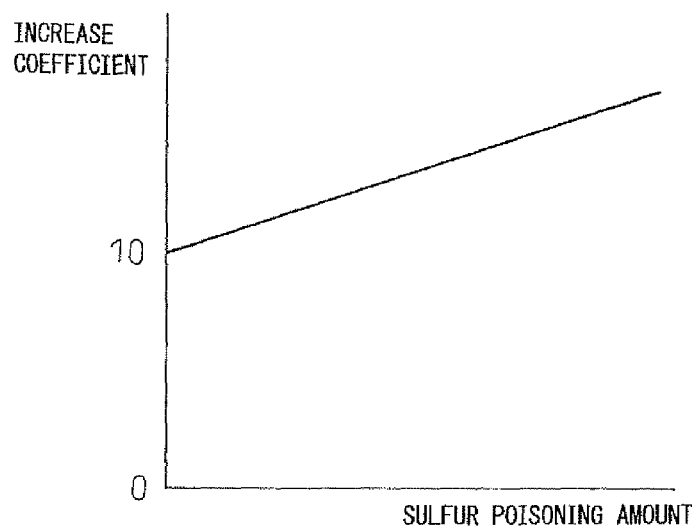
FIG. 21 is a view showing an increase coefficient.

On the other hand, if the sulfur which is contained in the exhaust gas sticks to the surface of the precious metal, that is, if the precious metal is poisoned by sulfur, active $NO_2^*$ becomes harder to produce. Therefore, it is preferable to increase the feed amount of hydrocarbons QE as the sulfur poisoning amount of the precious metal is increased so that the amount of production of active $NO_2^*$ does not fall even if the precious metal is poisoned by sulfur. In the embodiment shown in FIG. 21, the increase coefficient for the hydrocarbon feed amount QE is increased along with the increase in the sulfur poisoning amount so that the amount of production of active $NO_2^*$ does not fall even if the sulfur poisoning amount is increased.

Figure 22:
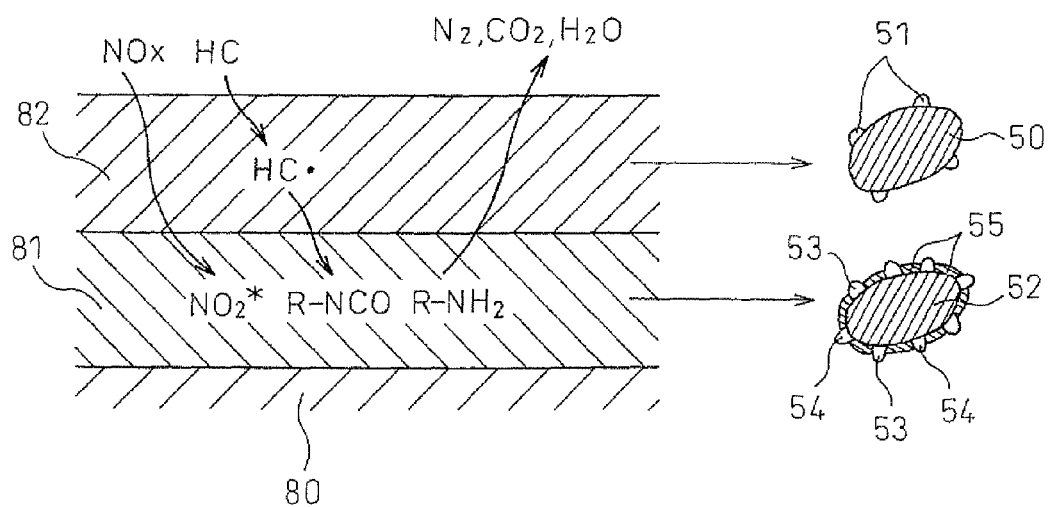
FIG. 22 is a partial enlarged cross-sectional view of another catalyst for removing $NO_x$.

FIG. 22 shows the case of forming the hydrocarbon partial oxidation catalyst 13 and the exhaust purification catalyst 14 shown in FIG. 1 by a single catalyst. This catalyst is for example provided with a large number of exhaust gas channels extending in the direction of flow of the exhaust gas. FIG. 22 shows an enlarged cross-sectional view of the surface part of the inner circumferential wall 80 of an exhaust gas channel of the catalyst. As shown in FIG. 22, on the surface of the inner circumferential wall 80 of the exhaust gas channel, a bottom coat layer 81 is formed. On this bottom coat layer 81, a top coat layer 82 is formed. In the example shown in FIG. 22, both the coat layers 81 and 82 are comprised of powder aggregates. FIG. 22 shows enlarged views of the powder forming the coat layers 81 and 82. From the enlarged views of the powder, it is learned that the top coat layer 82 is comprised of the hydrocarbon partial oxidation catalyst shown in FIG. 2(A), for example, an oxidation catalyst, while the bottom coat layer 81 is comprised of the exhaust purification catalyst shown in FIG. 2(B).

When the catalyst shown in FIG. 22 is used, as shown in FIG. 22, the hydrocarbons HC which are contained in the exhaust gas diffuse inside the top coat layer 82 and are partially oxidized. The partially oxidized hydrocarbons diffuse inside the bottom coat layer 81. That is, in the example shown in FIG. 22 as well, in the same way as the example shown in FIG. 1, the hydrocarbon partial oxidation catalyst and the exhaust purification catalyst are arranged so that the hydrocarbons which were partially oxidized at the hydrocarbon partial oxidation catalyst flow to the exhaust purification catalyst. On the other hand, in the catalyst shown in FIG. 22, when the first $NO_x$ purification method is used, the $NO_x$ which is contained in the exhaust gas diffuses to the inside of the bottom coat layer 81 and becomes active $NO_2^*$. At this time, at the bottom coat layer 81, the reducing intermediate R—NCO or R—$NH_2$ is produced from the active $NO_2^*$ and the partially oxidized hydrocarbons. Furthermore, the active $NO_2^*$ reacts with the reducing intermediate R—HCO or R—$NH_2$ to become $N_2$, $CO_2$, and $H_2O$.

On the other hand, as shown in FIG. 2(B), on the catalyst carrier 52 of the exhaust purification catalyst 14, precious metals 53 and 54 are carried. Therefore, inside of the exhaust purification catalyst 14 as well, it is possible to reform the hydrocarbons to radical hydrocarbons HC with a small carbon number. In this case, if the hydrocarbons can be sufficiently reformed inside the exhaust purification catalyst 14, that is, if the hydrocarbons can be sufficiently partially oxidized inside of the exhaust purification catalyst 14, it is not necessary to arrange the oxidation catalyst 13 as shown in FIG. 1 upstream of the exhaust purification catalyst 14. Therefore, in an embodiment according to the present invention, no oxidation catalyst 13 is attached inside of the engine exhaust passage. Therefore, in this embodiment, the hydrocarbons which are injected from the hydrocarbon feed valve 16 are directly fed to the exhaust purification catalyst 14.

In this embodiment, the hydrocarbons which are injected from the hydrocarbon feed valve 16 are partially oxidized inside of the exhaust purification catalyst 14. Furthermore, inside of the exhaust purification catalyst 14, active $NO_2^*$ is produced from the $NO_x$ which is contained in the exhaust gas. Inside of the exhaust purification catalyst 14, the reducing intermediate R—NCO and R—$NH_2$ is produced from these active $NO_2^*$ and partially oxidized hydrocarbons. Furthermore, the active $NO_2^*$ reacts with the reducing intermediate R—NCO or R—$NH_2$ to become $N_2$, $CO_2$, and $H_2O$. That is, in this embodiment, the exhaust purification catalyst 14 for reacting the hydrocarbons injected from the hydrocarbon feed valve 16 and partially oxidized and the $NO_x$ contained in the exhaust gas is arranged inside of the engine exhaust passage downstream of the hydrocarbon feed valve 16.

REFERENCE SIGNS LIST

4 . . . intake manifold
5 . . . exhaust manifold
7 . . . exhaust turbocharger
12 . . . exhaust pipe
13 . . . oxidation catalyst
14 . . . exhaust purification catalyst
16 . . . hydrocarbon feed valve

The invention claimed is:

1. An exhaust purification system of an internal combustion engine, the exhaust purification system comprising:
   a hydrocarbon feed valve for feeding hydrocarbons arranged inside an engine exhaust passage; and
   an exhaust purification catalyst, downstream of the hydrocarbon feed valve, for reacting $NO_x$ contained in exhaust gas and hydrocarbons which are injected from the hydrocarbon feed valve and are partially oxidized, wherein
      a precious metal catalyst is carried on the exhaust purification catalyst,
      a basic layer is formed on the exhaust purification catalyst,
      a top coat layer comprised of a hydrocarbon partial oxidation catalyst is formed on a bottom coat layer comprised of the exhaust purification catalyst, and
      the exhaust purification catalyst has a property of:
         chemically reducing the $NO_x$ contained in the exhaust gas when hydrocarbons are injected from the hydrocarbon feed valve at predetermined feed intervals while maintaining an air-fuel ratio of an exhaust gas flowing into the exhaust purification catalyst lean, and
         of being increased in a storage amount of $NO_x$ contained in the exhaust gas when the feed intervals of the hydrocarbons are longer than the predetermined feed intervals, and
      at the time of engine operation, a first $NO_x$ purification method that injects hydrocarbons from the hydrocarbon feed valve at said predetermined feed intervals while maintaining the air-fuel ratio of the exhaust gas flowing into the exhaust purification catalyst lean so as to remove the $NO_x$ contained in the exhaust gas and a second $NO_x$ purification method that switches the air-fuel ratio of the exhaust gas that flows to the exhaust purification catalyst from lean to rich by intervals longer than said predetermined feed intervals to remove the $NO_x$ are selectively used in accordance with an operating state of an engine.

2. An exhaust purification system of an internal combustion engine as claimed in claim 1, wherein inside of the engine exhaust passage downstream of the hydrocarbon feed valve, said exhaust purification catalyst and the hydrocarbon partial oxidation catalyst which is able to partially oxidize hydrocarbons injected from the hydrocarbon feed valve are arranged so that the hydrocarbons which are partially oxidized at the hydrocarbon partial oxidation catalyst flow into the exhaust purification catalyst.

3. An exhaust purification system of an internal combustion engine as claimed in claim 2, wherein the hydrocarbon partial oxidation catalyst is comprised of an oxidation catalyst which is arranged inside of the engine exhaust passage upstream of the exhaust purification catalyst.

4. An exhaust purification system of an internal combustion engine as claimed in claim 2, wherein in the first $NO_x$ purification method, $NO_x$ contained in the exhaust gas and partially oxidized hydrocarbons are reacted by the precious metal catalyst to produce a reducing intermediate containing nitrogen and hydrocarbons, the produced reducing intermediate is held on the basic layer, $NO_x$ is chemically reduced by a reducing action of the reducing intermediate held on the basic layer, and the predetermined feed intervals of the hydrocarbons are the feed intervals necessary for a continued presence of the reducing intermediate on a basic exhaust gas flow surface part.

5. An exhaust purification system of an internal combustion engine as claimed in claim 1, wherein in the first $NO_x$ purification method, $NO_x$ contained in the exhaust gas and partially oxidized hydrocarbons are reacted by the precious metal catalyst to produce a reducing intermediate containing nitrogen and hydrocarbons, the produced reducing intermediate is held on the basic layer, $NO_x$ is chemically reduced by a reducing action of the reducing intermediate held on the basic layer, and the predetermined feed intervals of the hydrocarbons are the feed intervals necessary for a continued presence of the reducing intermediate on a basic exhaust gas flow surface part.

6. An exhaust purification system of an internal combustion engine as claimed in claim 1, wherein in the second $NO_x$ purification method, when the air-fuel ratio of the exhaust gas flowing into the exhaust purification catalyst is lean, $NO_x$ in the exhaust gas is absorbed in the basic layer and, when the air-fuel ratio of the exhaust gas flowing into the exhaust purification catalyst becomes rich, the absorbed $NO_x$ is released from the basic layer and chemically reduced.

7. An exhaust purification system of an internal combustion engine as claimed in claim 1, wherein said precious metal catalyst is comprised of platinum Pt and at least one of rhodium Rh and palladium Pd.

8. An exhaust purification system of an internal combustion engine as claimed in claim 1, wherein said basic layer includes an alkali metal, alkali earth metal, rare earth, or metal able to donate electrons to $NO_x$.

9. An exhaust purification system of an internal combustion engine as claimed in claim 1, wherein the first $NO_x$ purification method is only used when a temperature of the oxidation catalyst becomes an activation temperature or more and wherein use of the first $NO_x$ purification method is prohibited when the temperature of the oxidation catalyst is lower than the activation temperature.

10. An exhaust purification system of an internal combustion engine as claimed in claim 9, wherein either the first $NO_x$ purification method or the second $NO_x$ purification method is used when a temperature of the oxidation catalyst is the activation temperature or more.

11. An exhaust purification system of an internal combustion engine as claimed in claim 10, wherein when use of the first $NO_x$ purification method would result in a higher $NO_x$ purification efficiency compared with using the second $NO_x$ purification method, the first $NO_x$ purification method is used, while when use of the second $NO_x$ purification method would result in a higher $NO_x$ purification efficiency compared with using the first $NO_x$ purification method, the second $NO_x$ purification method is used.

12. An exhaust purification system of an internal combustion engine as claimed in claim 10, wherein the $NO_x$ purification rate when using the first $NO_x$ purification method starts to be lowered when a temperature of the exhaust purification catalyst becomes a limit temperature or less, when the temperature of the exhaust purification catalyst is higher than the limit temperature, the first $NO_x$ purification method is used, and when the temperature of the exhaust purification catalyst is lower than the limit temperature, the second $NO_x$ purification method is used.

13. An exhaust purification system of an internal combustion engine as claimed in claim 9, wherein the second $NO_x$ purification method is used when a temperature of the oxidation catalyst is lower than the activation temperature.

14. An exhaust purification system of an internal combustion engine as claimed in claim 1, wherein when switched from the second $NO_x$ purification method to the first $NO_x$ purification method, an air-fuel ratio of an exhaust gas flowing into the exhaust purification catalyst is temporarily made rich to release and chemically reduce $NO_x$ which is stored in the exhaust purification catalyst.

15. An exhaust purification system of an internal combustion engine as claimed in claim 14, wherein directly before being switched from the second $NO_x$ purification method to the first $NO_x$ purification method, the air-fuel ratio of the exhaust gas flowing into the exhaust purification catalyst is made rich.

16. An exhaust purification system of an internal combustion engine as claimed in claim 15, wherein directly after being switched from the second $NO_x$ purification method to the first $NO_x$ purification method as well, the air-fuel ratio of the exhaust gas flowing into the exhaust purification catalyst is made rich.

17. An exhaust purification system of an internal combustion engine as claimed in claim 14, wherein after being switched from the second $NO_x$ purification method to the first $NO_x$ purification method, the $NO_x$ purification action is started by the first $NO_x$ purification method, then the air-fuel ratio of the exhaust gas flowing into the exhaust purification catalyst is made rich.

18. An exhaust purification system of an internal combustion engine as claimed in claim 1, wherein, where the second $NO_x$ purification method is used, when calculated $NO_x$ storage amount to the exhaust purification catalyst exceeds a predetermined allowable value, an air-fuel ratio of an exhaust gas flowing into the exhaust purification catalyst is temporarily made rich and when switched from the first $NO_x$ purification method to the second $NO_x$ purification method, the $NO_x$ storage amount which is calculated when the first $NO_x$ purification method is used and the $NO_x$ storage amount which is calculated after switching to the second $NO_x$ purification method are totaled up and, when a total value exceeds a predetermined allowable value, the air-fuel ratio of the exhaust gas flowing into the exhaust purification catalyst is made temporarily rich.

* * * * *